US011374699B2

(12) United States Patent
Shellhammer et al.

(10) Patent No.: US 11,374,699 B2
(45) Date of Patent: Jun. 28, 2022

(54) HYBRID AUTOMATIC REPEAT REQUEST (HARQ) WITH SLIDING WINDOW FEEDBACK

(71) Applicant: QUALCOMM Incorporated, San Diego, CA (US)

(72) Inventors: Stephen Jay Shellhammer, Ramona, CA (US); Jialing Li Chen, San Diego, CA (US); Dung Ngoc Doan, San Diego, CA (US); Bin Tian, San Diego, CA (US); Alfred Asterjadhi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/945,605

(22) Filed: Jul. 31, 2020

(65) Prior Publication Data

US 2021/0036809 A1 Feb. 4, 2021

Related U.S. Application Data

(60) Provisional application No. 62/882,414, filed on Aug. 2, 2019.

(51) Int. Cl.
| *H04L 1/18* | (2006.01) |
| *H04L 1/16* | (2006.01) |
| *H04B 7/0456* | (2017.01) |
| *H04L 1/00* | (2006.01) |
| *H04W 80/02* | (2009.01) |
| *H04W 84/12* | (2009.01) |

(52) U.S. Cl.
CPC ......... *H04L 1/1819* (2013.01); *H04B 7/0456* (2013.01); *H04L 1/0013* (2013.01);
(Continued)

(58) Field of Classification Search
CPC ..... H04W 80/02; H04W 80/06; H04W 80/00; H04W 84/12; H04B 7/0456;
(Continued)

(56) References Cited

U.S. PATENT DOCUMENTS

2016/0037524 A1* 2/2016 Krzymien ............. H04L 1/1896
370/329
2016/0050049 A1* 2/2016 Yang ..................... H04L 1/1845
370/329

(Continued)

*Primary Examiner* — Phong La
(74) *Attorney, Agent, or Firm* — DeLizio Law, PLLC

(57) ABSTRACT

This disclosure provides systems, methods, and apparatus, including computer programs encoded on computer-readable media, for implementing a hybrid automatic repeat request (HARQ) protocol in a wireless local area network (WLAN). A first WLAN device may transmit a first HARQ frame to a second WLAN device. The first HARQ frame may include initial transmissions of a first plurality of forward error correction (FEC) codewords. The HARQ protocol may support new techniques for feedback, such as a feedback capability in which a bitmap may be used to indicate decoding failures of codewords. The first feedback message may include indicators to change a HARQ configuration parameter based on channel conditions. In some implementations, the second HARQ frame may combine retransmissions regarding the failed codewords with initial transmissions of a second plurality of codewords.

30 Claims, 21 Drawing Sheets

(52) U.S. Cl.
CPC ........... *H04L 1/1614* (2013.01); *H04W 80/02* (2013.01); *H04W 84/12* (2013.01)

(58) Field of Classification Search
CPC ... H04B 7/0452; H04B 7/0417; H04L 1/1819; H04L 1/1812; H04L 1/18; H04L 1/1816; H04L 1/1614; H04L 1/1621; H04L 1/1628; H04L 1/1635; H04L 1/001; H04L 1/0013

See application file for complete search history.

(56) References Cited

U.S. PATENT DOCUMENTS

| | | | |
|---|---|---|---|
| 2017/0026956 A1* | 1/2017 | Yin | H04L 1/0031 |
| 2017/0230149 A1 | 8/2017 | Wang et al. | |
| 2018/0006791 A1* | 1/2018 | Marinier | H04L 5/0055 |
| 2018/0205431 A1* | 7/2018 | Nammi | H04B 7/0413 |
| 2019/0097762 A1* | 3/2019 | Jeon | H04W 28/04 |
| 2019/0173623 A1* | 6/2019 | Khosravirad | H04L 1/0079 |
| 2020/0083983 A1* | 3/2020 | Chen | H03M 13/3769 |
| 2020/0099469 A1* | 3/2020 | Jiang | H04L 1/0041 |
| 2020/0136786 A1* | 4/2020 | Wu | H04L 5/0005 |
| 2020/0177319 A1* | 6/2020 | Cariou | H04L 1/1819 |
| 2020/0186299 A1* | 6/2020 | Lunttila | H04L 1/1812 |
| 2020/0195376 A1* | 6/2020 | Zhang | H04L 1/1819 |
| 2020/0204225 A1* | 6/2020 | Huang | H04B 7/0469 |
| 2020/0259625 A1* | 8/2020 | Papasakellariou | H04L 1/08 |
| 2020/0374046 A1* | 11/2020 | Li | H04L 27/2607 |
| 2021/0045181 A1* | 2/2021 | Li | H04L 5/0005 |
| 2021/0219268 A1* | 7/2021 | Li | H04W 80/02 |

\* cited by examiner

HYBRID AUTOMATIC REPEAT REQUEST (HARQ) WITH SLIDING WINDOW FEEDBACK

CROSS-REFERENCE TO RELATED APPLICATIONS

This Patent Application claims priority to U.S. Provisional Patent Application No. 62/882,414 filed Aug. 2, 2019, entitled "HYBRID AUTOMATIC REPEAT REQUEST (HARQ) WITH SLIDING WINDOW FEEDBACK" and assigned to the assignee hereof. The disclosure of the prior Application is considered part of and are incorporated by reference in this Patent Application.

TECHNICAL FIELD

This disclosure relates to the field of wireless communication, and more particularly to implementing a hybrid automatic repeat request (HARQ) feature in a wireless local area network (WLAN).

DESCRIPTION OF THE RELATED TECHNOLOGY

A wireless local area network (WLAN) may be formed by two or more WLAN devices (which may be referred to as stations (STAs)) that share a wireless communication medium using common service settings. One or more of the WLAN devices (which may be referred to as an access point (AP)) may establish the common service settings. An AP is a type of STA that performs a distribution system access function in the WLAN. The basic building block of a WLAN conforming to the Institute of Electrical and Electronics Engineers (IEEE) 802.11 family of standards is a Basic Service Set (BSS), which is managed by an AP. An AP is a type of WLAN device that performs a distribution system access function in the WLAN. Each BSS is identified by a Basic Service Set Identifier (BSSID) that is advertised by the AP. An AP periodically broadcasts beacon frames to enable any STAs within wireless range of the AP to establish or maintain a communication link with the WLAN.

A wireless communication between two WLAN devices (which may be referred to as a sending STA and a receiving STA) may be susceptible to interference or other challenges which impair the wireless communication medium. A wireless transmission from a sending STA may include error checking and redundancy information that enables a receiving STA to discover or correct errors in the wireless transmission. If the errors cannot be corrected, the receiving STA may request the data to be retransmitted by the sending STA. For example, the receiving STA may send a feedback message (including an acknowledgment or negative acknowledgment) to indicate whether the data was successfully received. A traditional retransmission protocol may include a feedback message to request a retransmission of data from the AP. Current retransmission protocols may be improved.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication by a wireless communication device of a first wireless local area network (WLAN) device that supports a hybrid automatic repeat request (HARQ) protocol. The method may include generating a first HARQ frame for transmission to a second WLAN device, the first HARQ frame including at least initial transmissions of a first plurality of codewords. The method may include receiving a first feedback message from the second WLAN device. The method may include determining, based at least in part on, the first feedback message that the second WLAN device is unable to decode one or more codewords of the first plurality of codewords. The method may include generating a second HARQ frame for transmission to the second WLAN device, the second HARQ frame including at least a retransmission regarding at least a first codeword of the one or more codewords.

In some implementations, the first feedback message includes a bitmap to indicate a decoding failure of one or more codewords of the first HARQ frame, including at least the first codeword.

In some implementations, the bitmap includes ordered bits that correspond to an ordered subset of the first plurality of codewords.

In some implementations, the first feedback message includes a field indicating a starting codeword associated with a first bit of the ordered bits.

In some implementations, the first feedback message includes a field indicating a length of the bitmap.

In some implementations, the bitmap includes ordered bits that correspond to an ordered set of media access control (MAC) protocol data units (MPDUs) that correspond to the codewords of the first plurality of codewords and the second plurality of codewords.

In some implementations, the bitmap includes ordered bits that correspond to an ordered set of groups of codewords of the first plurality of codewords.

In some implementations, a size of each of the groups of codewords of the first plurality of codewords is defined by a technical standard specification.

In some implementations, the method includes determining a size that indicates how many codewords to include in each the groups of codewords. The method may include informing the second WLAN device of the size as part of a configuration of the HARQ protocol.

In some implementations, the first feedback message includes an indication a highest codeword index which the second WLAN device has successfully decoded. The method may include removing codewords having a codeword index lower than the highest codeword index from a HARQ transmitter memory of the first WLAN device.

In some implementations, the first feedback message does not include feedback for codewords that the second WLAN device is still processing or pending decoding.

In some implementations, the first feedback message includes an indication of an amount of time pending for the second WLAN device to complete decoding of the codewords that are still pending.

In some implementations, the first feedback message includes an indication of an amount of codewords pending for the second WLAN device to decode.

In some implementations, the method includes determining a receiver processing capability of the second WLAN device, and determining a quantity of the second plurality of codewords to include in the second HARQ frame based, at least in part, on the receiver processing capability.

In some implementations, the receiver processing capability is based on at least one member of a group consisting of: an amount of memory available at the second WLAN device for processing HARQ transmissions; a time delay for the second WLAN device to process the HARQ transmissions; an amount of time for physical (PHY) layer processing of the first codeword using the second HARQ frame to determine a corrected first codeword; a media access control (MAC) layer processing time of the HARQ transmissions; and the MAC layer processing time to prepare an acknowledgement to an aggregated MAC protocol data unit (A-MPDU) associated with the HARQ transmissions.

In some implementations, determining the receiver processing capability includes, prior to transmission of the first HARQ frame, receiving a management frame from the second WLAN device, the management frame indicating a first value for the receiver processing capability of the second WLAN device.

In some implementations, the first feedback message indicates a second value for the receiver processing capability of the second WLAN device for processing the second HARQ frame. The method may include adjusting a quantity of the second plurality of codewords based on the second value for the receiver processing capability.

In some implementations, the method includes determining that the first WLAN device and the second WLAN device both support a feedback feature of the HARQ protocol.

In some implementations, determining that the first WLAN device and the second WLAN device both support the feedback feature includes obtaining a feedback feature capability indicator from the second WLAN device that indicates that the second WLAN device supports the feedback feature.

In some implementations, determining that the first WLAN device and the second WLAN device both support the feedback feature includes determining that the second WLAN device supports a version of the HARQ protocol that includes the feedback feature.

In some implementations, generating the second HARQ frame includes including retransmissions regarding each codeword for which the first feedback message indicates a decoding failure by the second WLAN device; and including the initial transmissions of a second plurality of codewords.

In some implementations, generating the second HARQ frame further includes including signaling in the second HARQ frame, the signaling indicative of a boundary between the retransmissions and the initial transmissions.

In some implementations, the signaling is included in a preamble of the second HARQ frame.

In some implementations, the signaling includes a length of a first portion of the second HARQ frame, wherein the first portion includes the retransmissions, and wherein the initial transmissions follow the first portion.

In some implementations, the signaling includes an indicator to determine a length of either the retransmissions or the initial transmissions, the indicator associated with at least member of a group consisting of bit rate, coding rate, quantity of repeated code bits, and puncturing rate.

In some implementations, the retransmissions and the initial transmissions are concatenated in order in the second HARQ frame.

In some implementations, the second HARQ frame includes a field between the retransmissions and the initial transmissions, the field indicative of a boundary between the retransmissions and the initial transmissions.

In some implementations, the method includes determining to generate a subsequent HARQ frame for transmission to the second WLAN device, wherein the subsequent HARQ frame is a last HARQ frame of a HARQ transmission. The method may include generating the last HARQ frame using a different format for the last HARQ frame based, at least in part, on a receiver processing capability for processing the last HARQ frame.

In some implementations, the last HARQ frame is generated for transmission using a lower modulation order when the last HARQ frame includes initial transmissions of codewords.

In some implementations, the different format includes a change to at least member of a group consisting of bit rate, coding rate, quantity of repeated code bits, and puncturing rate. In some implementations, the change is based, at least in part, to provide additional time or greater reliability for the second WLAN device to process the last HARQ frame before a time for the second WLAN device to send a feedback message regarding the last HARQ frame.

In some implementations, the first WLAN device is an access point (AP) and the second WLAN device is a station (STA).

In some implementations, the method includes receiving a second feedback message from the second WLAN device, wherein the second feedback message indicates that the second WLAN device has reached a maximum number of decoding failures for the first codeword. In some implementations, the method includes refraining from including a retransmission of the first codeword in a subsequent HARQ frame.

In some implementations, the first feedback message includes an indicator to change a HARQ configuration parameter based, at least in part, on the first HARQ frame.

In some implementations, the indicator is based, at least in part, on channel conditions of a wireless channel between the first WLAN device and the second WLAN device.

In some implementations, the HARQ configuration parameter includes a modulation order, bit rate, coding rate, a requested quantity of repeated code bits, or puncturing rate.

In some implementations, the first feedback message includes a recommended code bit rate to include in the retransmission regarding the first codeword, the code bit rate based on puncturing rate or quantity of retransmitted code bits.

In some implementations, the indicator includes an explicit value for the HARQ configuration parameter.

In some implementations, the indicator includes a relative value for the HARQ configuration parameter, the relative value indicating an increase or decrease of the HARQ configuration parameter used for the first HARQ frame.

Another innovative aspect of the subject matter described in this disclosure can be implemented in a method for wireless communication by a wireless communication device of a first wireless local area network (WLAN) device that supports a hybrid automatic repeat request (HARQ) protocol. The method may include obtaining a first HARQ frame from a second WLAN device, the first HARQ frame including at least initial transmissions of a first plurality of codewords. The method may include generating a first feedback message in response to the first HARQ frame, the first feedback message indicating one or more codewords of the first plurality of codewords that the first WLAN device is unable to decode. The method may include obtaining a second HARQ frame from the second WLAN device, the second HARQ frame including a retransmission regarding at least a first codeword of the one or more codewords and initial transmissions of a second plurality of codewords.

In some implementations, the method may include, prior to obtaining the first HARQ frame, generating a HARQ control message for transmission to the second WLAN device, the HARQ control message including an indicator that the first WLAN device supports a feedback feature, and obtaining an instruction from the second WLAN device to use the feedback feature which causes the first WLAN device to generate the first feedback message using a bitmap to indicate a decoding failure of one or more codewords of the first HARQ frame.

In some implementations, the bitmap includes ordered bits that correspond to an ordered subset of the first plurality of codewords.

In some implementations, the method may include including, in the first feedback message, a field indicating a starting codeword associated with a first bit of the ordered bits.

In some implementations, the method may include determining a length of the bitmap and including, in the first feedback message a field indicating a length of the bitmap.

In some implementations, the length of the bitmap is determined based, at least in part, on a quantity of codewords in the first HARQ frame.

In some implementations, the bitmap includes ordered bits that correspond to an ordered set of groups of codewords of the first plurality of codewords.

In some implementations, the first feedback message indicates a decoding failure of one or more codewords of the first HARQ frame.

In some implementations, the first feedback message does not include feedback for codewords still pending decoding by the first WLAN device.

In some implementations, the first feedback message includes an indication of an amount of time pending for the first WLAN device to complete decoding of the codewords that are still pending.

In some implementations, the first feedback message includes an indication of an amount of codewords pending for the first WLAN device to decode.

In some implementations, the first feedback message includes an indication a highest codeword index which the second WLAN device has successfully decoded, the indication provided to the second WLAN device so that the second WLAN device can remove old codewords from a HARQ transmitter memory of the second WLAN device.

In some implementations, the first feedback message includes a recommended set of code bits to include in the retransmission regarding the first codeword.

In some implementations, the method further includes generating a second feedback message for transmission to the second WLAN device, wherein the second feedback message indicates that the first WLAN device has reached a maximum number of decoding failures for the first codeword.

In some implementations, the first feedback message includes an indicator to change a HARQ configuration parameter based, at least in part, on the first HARQ frame.

In some implementations, the indicator is based, at least in part, on channel conditions of a wireless channel between the first WLAN device and the second WLAN device.

In some implementations, the HARQ configuration parameter includes a modulation order, bit rate, coding rate, a requested quantity of repeated code bits, or puncturing rate.

In some implementations, the indicator includes an explicit value for the HARQ configuration parameter.

In some implementations, the indicator includes a relative value for the HARQ configuration parameter, the relative value indicating an increase or decrease of the HARQ configuration parameter used for the first HARQ frame.

Another innovative aspect of the subject matter described in this disclosure can be implemented in a method for wireless communication by a wireless communication device of a first wireless local area network (WLAN) device that supports a hybrid automatic repeat request (HARQ) protocol.

Aspects of the subject matter described in this disclosure can be implemented a method, a device, a software program, a system, or other means to perform the above-mentioned features.

Details of one or more implementations of the subject matter described in this disclosure are set forth in the accompanying drawings and the description below. Other features, aspects, and advantages will become apparent from the description, the drawings, and the claims. Note that the relative dimensions of the following Figures may not be drawn to scale.

BRIEF DESCRIPTION OF THE DRAWINGS

Like reference numbers and designations in the various drawings indicate like elements.

DETAILED DESCRIPTION

Figure 1:
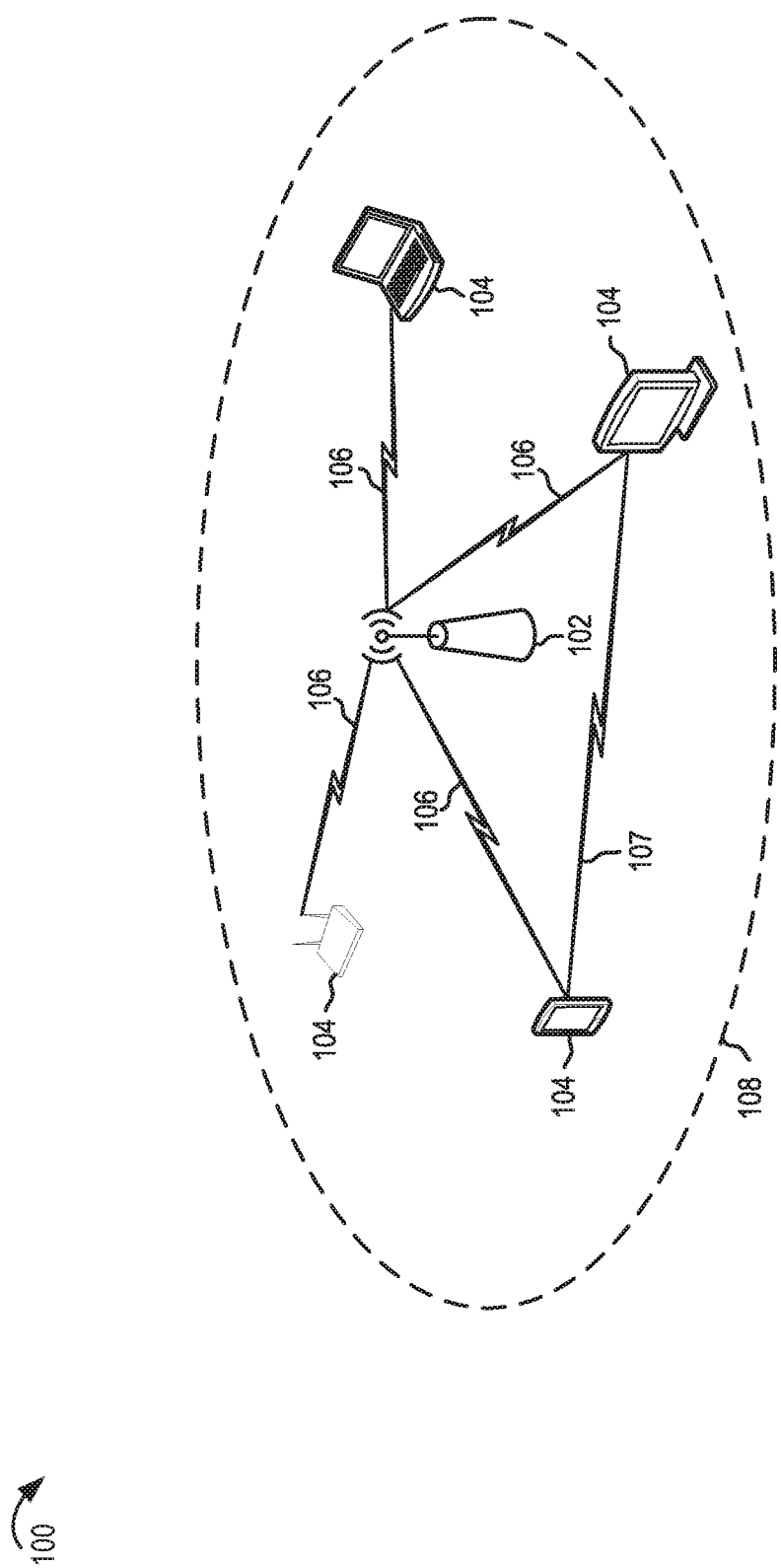
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

A wireless local area network (WLAN) in a home, apartment, business, or other area may include one or more WLAN devices. Each WLAN device may have a station (STA) interface which is an addressable entity that shares a wireless communication medium with other STAs. An AP is a type of STA that performs a distribution system access function in the WLAN. In some documents, WLAN devices may be referred to as STAs, regardless of whether the WLAN device is an AP or a non-AP STA. For brevity, the examples of this disclosure refer to a first WLAN device (acting as a sending STA) that communicates data to a second WLAN device (acting as a receiving STA). Due to the nature of wireless communication, the WLAN devices may implement a retransmission protocol to improve reliable delivery of a media access control (MAC) protocol data unit (MPDU) or to improve the overall throughput from the first WLAN device to the second WLAN device. A physical convergence layer (PHY) protocol data unit (PPDU) may include one or more MPDUs. For example, one type of PPDU (referred to as an Aggregated MPDU, or A-MPDU) may include multiple MPDUs in a payload of the AMPDU. A PPDU also may be referred to as a packet or a frame in some aspects of this disclosure. In some implementations, a PPDU may contain an MPDU or an A-MPDU that is addressed to a receiver. In some other implementations, the examples described in this disclosure are applicable in the cases where the transmitted PPDU may contain more than one PSDU, each of which is addressed to independent receivers, or generated by independent transmitters.

A traditional retransmission protocol (which may be referred to as a baseline approach, or as automatic repeat request (ARQ)) may use a first type of feedback message that includes an acknowledgment (ACK). In some implementations, the absence of an ACK may be interpreted as a negative acknowledgment (NACK). For example, the first type of feedback message may be referred to as a traditional ACK message type. A receiving STA may send a traditional ACK message to the sending STA to indicate whether the receiving STA has successfully received the frame. If the sending STA does not receive a traditional ACK message (such as by an expected time) in response to a frame, the sending STA may retransmit the original frame. In some implementations, the sending STA may retransmit the frame with a lower data rate compared to the initial transmission to increase the likelihood of reception of the frame. In another retransmission protocol, the receiving STA may bundle ACKs or NACKs for multiple MPDUs in a block acknowledgment feedback message, where each MPDU can be sent in separate packets or as an A-MPDU in a single packet. The block acknowledgment feedback message may be referred to as a Block ACK message type. The Block ACK message type may indicate which MPDUs in an A-MPDU have been successfully received. A sending STA may retransmit those MPDUs which are not indicated as being received correctly in the Block ACK feedback message.

Hybrid automatic repeat request (hybrid ARQ or HARQ) is another retransmission protocol. HARQ has previously been used in wide area wireless communication systems. HARQ uses a combination of error detection and error correction. A HARQ transmission may include error checking bits that are added to data to be transmitted using an error-detecting (ED) code, such as a cyclic redundancy check (CRC). The error checking bits may be used by a receiving STA to determine if it has properly decoded the received HARQ transmission. Additionally, the HARQ transmission may utilize an error correction technique. For example, the original data may be encoded with a forward error correction (FEC) code. Both original data and parity bits may be sent in the HARQ transmission. A receiving STA may be able to use the parity bits to correct errors in the transmission, thus avoiding a retransmission. The ED code may be omitted when encoding is used that can perform both FEC and ED, such as a Reed-Solomon code. Also, low-density parity check (LDPC) codes can perform error detection by checking the values of the parity bits, after convergence of the LDPC decoder.

Another feature of HARQ is that a receiving STA may combine a first HARQ transmission with a second HARQ transmission. For example, if the receiving STA cannot properly decode (and cannot correct the errors) the first HARQ transmission, the receiving STA may send a HARQ feedback message that indicates at least part of the first HARQ transmission was not properly decoded. The HARQ feedback message is another type of feedback message, different from the traditional ACK/NACK feedback message type and the Block ACK feedback message type (which also may be referred to as non-HARQ feedback message types). In response to receiving the HARQ feedback message, the sending STA may transmit a second HARQ transmission to the receiving STA to communicate at least part of the first HARQ transmission that was not acknowledged. The combined HARQ transmissions may be processed for decoding and error correction. The receiving STA may combine the second HARQ transmission with the first HARQ transmission so that the complete signal associated with the HARQ transmissions can be decoded.

A HARQ protocol may support partial retransmission of data from a sending STA to a receiving STA. For example, in Chase combining, the sending STA may transmit the same FEC codewords in the HARQ retransmission that were in the HARQ initial transmission. In punctured Chase combining, the sending STA may puncture some of the coded bits from the original FEC codewords to reduce the airtime needed for the HARQ retransmission. In some implementations, incremental redundancy may use some of the original codeword and additional error correcting codes (such as additional parity bits). For brevity, many of the examples of this disclosure are based on low-density parity check (LDPC) encoding. However, other types of FEC encoding may be used, such as binary convolutional coding (BCC).

Implementing HARQ in a WLAN may improve reliability of wireless communication. Currently, the IEEE is not constrained by traditional HARQ protocols and is considering new techniques for improving and adapting HARQ for use in a WLAN. For example, a sending STA and receiving STA may benefit from dynamically changing a HARQ protocol parameter based on changing wireless channel conditions. Furthermore, techniques for HARQ feedback may permit more efficient techniques for HARQ in a WLAN.

This disclosure provides several techniques for using HARQ on a WLAN. The various implementations described in this disclosure may be combined or modified for use with standards-compliant WLAN devices. Some implementations include signaling regarding HARQ capabilities, HARQ transmissions, and various types of acknowledgements that may be used.

In one aspect of this disclosure, a HARQ transmission may include multiple HARQ frames from a sending STA to a receiving STA. Each HARQ frame may include either an initial transmission of one or more FEC codewords, a retransmission regarding an FEC codeword that the receiving STA was unable to successfully decode, or a combination of retransmissions and initial transmissions. Thus, in the HARQ protocol, a HARQ frame may support aggregation of a HARQ retransmission of previously failed codewords with a HARQ initial transmission for a next group of codewords. A feedback message from a receiving STA to the sending STA may indicate which previously sent codewords that the receiving STA was unable to decode.

In some implementations, the receiving STA may indicate decoding failures in the feedback message, while still processing remaining codewords of a previous HARQ frame. For example, this disclosure describes a difference between a decoding failure of a failed codeword versus those codewords which are still pending decoding by the receiving STA. The receiving STA may request retransmission for failed codewords that the receiving STA has attempted to decode but which had a decoding failure. However, the receiving STA may refrain from sending feedback regarding codewords which the receiving STA has not yet, or is currently, attempting to decode.

In some implementations, a feedback message format may be defined. For example, the feedback message format may include a bitmap for the receiving STA to indicate which FEC codewords have decoding failures. The use of a bitmap may reduce the size of the feedback message. In some implementations, the feedback message may a bitmap that includes ordered bits that correspond to an ordered set of FEC codewords included in a previous HARQ frame from the sending STA. The feedback message also may include a first field indicating a starting codeword associated with a first bit of the ordered bits and a second field indicating a length of the bitmap. Using a dynamic size of bitmap provides flexibility for the receiving STA to indicate decoding failures for both small or large sets of FEC codewords. Furthermore, the first field for indicating a starting codeword associated with the bitmap provides flexibility for reducing a size of the feedback message when the previous HARQ frame included FEC codewords that were successfully decoded by the receiving STA. In some implementations, the bitmap may be used to indicate groups of codewords (rather than single codewords).

In another aspect of this disclosure, a sliding window feedback capability is described. The sliding window feedback capability may enable the receiving STA to efficiently communicate decoding status for codewords. The sending STA and the receiving STA can maintain a feedback status based on a sliding window of ordered FEC codewords that may span multiple HARQ frames. An advantage of the sliding window feedback is that a receiving STA may refrain from sending feedback regarding FEC codewords which the receiving STA is still attempting to decode. Traditionally, the receiving STA may be required to send a negative acknowledgement for codewords that have not yet been decoded by the time for the feedback message. However, the traditional approach may result in unnecessary retransmission of FEC codewords. For example, the receiving STA may be capable of decoding the initial transmission of the FEC codewords, even though the decoding occurs after a time when the receiving STA is required to send a feedback message. The sliding window feedback capability permits the feedback to be based on FEC codewords that the receiving STA has attempted but failed to decode, while refraining from providing feedback for the FEC codewords that have not yet been attempted.

In one aspect of this disclosure, a sending STA may store information regarding source data and FEC encoding used to produce the initial transmission. The FEC encoding produces a first set of parity bits that are communicated with the source data. The FEC encoded data may be communicated as FEC codewords in the initial transmission. The sending STA may communicate additional parity bits associated with a particular FEC codeword when sending the retransmission. In another example, the sending STA may retransmit a punctured version of the original FEC codeword when sending the retransmission.

A receiving STA may indicate which FEC codewords of the previous HARQ frame have a decoding failure. The sending STA may utilize a memory (such as a buffer) of the transmitter to store source data and FEC codewords until they have been acknowledged. Similarly, the receiving STA may utilize memory (such as a buffer) of the receiver to store previous FEC codewords for use with the HARQ retransmission. In some implementations, the sending STA and the receiving STA may negotiate parameters to facilitate the retransmission protocol. For example, the sending STA and the receiving STA may exchange capability information or other parameters associated with the retransmission protocol. In some implementations, the sending STA and the receiving STA may determine the receiver processing capability. The receiver processing capability may indicate a rate at which the receiving STA can effectively process the codewords and produce a feedback message based on the combined initial transmission and retransmission. The receiver processing capability may be based on a variety of factors, including 1) an amount of memory available at the second WLAN device for processing HARQ transmissions, 2) a time delay for the second WLAN device to process the HARQ transmissions, 3) an amount of time for physical (PHY) layer processing of the first FEC codeword using the second HARQ frame to determine a corrected first FEC codeword, 4) a media access control (MAC) layer processing time of the HARQ transmissions, or 5) the MAC layer processing time to prepare an acknowledgement to an aggregated MAC protocol data unit (A-MPDU) associated with the HARQ transmissions. By exchanging parameters of the receiver processing capability, the sending STA may determine that the receiving STA needs more time to process the HARQ frame.

In some implementations, the feedback message may include a receiver processing status field. For example, the receiver processing status may indicate an amount of time for the receiving STA to complete attempting to process pending FEC codewords of the preceding HARQ frame. Alternatively, or additionally, the receiver processing status may indicate a quantity of pending FEC codewords. When the sliding window feedback capability is used, the feedback may include acknowledgement (or negative acknowledgement) regarding FEC codewords that the receiving STA has attempted to decode, as well as a quantity or time associated with the remaining FEC codewords that the receiving STA has not yet attempted to decode.

In another aspect of this disclosure, the sending STA may determine that a HARQ frame is a last HARQ frame of the HARQ transmission and use a different format for the last HARQ frame. The last HARQ frame may be smaller than previous HARQ frames. For example, the last HARQ frame may include only partial retransmissions of previously failed codewords or may have less data to include in the HARQ frame. Unless the uses a different format for the last HARQ frame, it is possible that the receiving STA will not be able to process the last HARQ frame before the feedback message is expected. The sending STA may use the different format to provide additional time for decoding or to use a more reliable transmission format. For example, the sending STA may use a lower modulation order for the last HARQ frame. This may be useful for more reliable decoding of the last HARQ frame, especially if the last HARQ frame includes initial transmissions of new codewords. In some implementations, the sending STA may adjust a bit rate, coding rate, quantity of repeated code bits, or puncturing rate for the last HARQ frame to provide additional time or more reliable communication of the last HARQ frame. For example, the sending STA may send more repeated code bits in the retransmitted codeword to increase the reliability of the retransmission.

In another aspect of this disclosure, signaling in the HARQ frames or the feedback messages may be used by the sending STA and the receiving STA maintain coordination of the sliding window feedback. For example, signaling in a HARQ frame may indicate a size, length, quantity of codewords, or other information indicative of how much of the HARQ frame includes retransmissions of previous FEC codewords versus initial transmissions of new FEC codewords. In some implementations, the signaling may include information about modulation order, bit rate, coding rate, quantity of repeated code bits, or puncturing rate associated with either the retransmissions or the initial transmission. This may be useful for adapting the HARQ frames based on channel conditions or to change the format of the last HARQ frame for more reliable delivery of the last HARQ frame.

In some implementations, the feedback message from the receiving STA to the sending STA may include additional information to support adaptation of the HARQ protocol. For example, the feedback message may include an indicator to change a HARQ configuration parameter, such as the modulation order, bit rate, coding rate, a requested quantity of repeated code bits, or puncturing rate. The indicator may include an explicit value for the HARQ configuration parameter or may include a relative value for the HARQ configuration parameter based on the preceding HARQ frame. For example, the relative value may indicate an increase or decrease of the HARQ configuration parameter used for the preceding HARQ frame.

Particular implementations of the subject matter described in this disclosure can be implemented to realize one or more of the following potential advantages. Implementing a retransmission protocol in a WLAN may improve the reliability of data communicated from a sending STA to a receiving STA. A retransmission protocol may improve the overall throughput from the sending STA to the receiving STA. The use of HARQ frames that can include both retransmissions and initial transmissions can enable the HARQ protocol to convey data more efficiently. The sliding window feedback can enable the sending STA to make efficient use of the wireless channel while providing additional time for the receiving STA to process the HARQ frames. Signaling in the HARQ frames permit the sending STA to adjust the tempo or reliability of the HARQ frames based on the decoding success or failure of the receiving STA on a per-frame basis. Furthermore, the feedback message signaling may enable the receiving STA to suggest improvements to the HARQ transmission based on channel conditions, receiver processing status, receiver processing capability, among other examples.

FIG. 1 shows a pictorial diagram of an example wireless communication network. FIG. 1 includes a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11aa, 802.11ah, 802.11ad, 802.11aq, 802.11ay, 802.11ax, 802.11az, 802.11ba, 802.11be, or later amendments). The WLAN 100 may include numerous wireless communication devices such as an access point (AP) 102 and multiple stations (STAs) 104 that have a wireless association with the AP 102. While only one AP 102 is shown, the WLAN network 100 also can include multiple APs 102. The IEEE 802.11-2016 standard defines a STA as an addressable unit. An AP is an entity that contains at least one STA and provides access via a wireless medium (WM)

for associated STAs to access a distribution service (such as another network, not shown). Thus, an AP includes a STA and a distribution system access function (DSAF). In the example of FIG. 1, the AP 102 may be connected to a gateway device (not shown) which provides connectivity to the other network 140. The DSAF of the AP 102 may provide access between the STAs 104 and another network 140. While AP 102 is described as an access point using an infrastructure mode, in some implementations, the AP 102 may be a traditional STA which is operating as an AP. For example, the AP 102 may be a STA capable of operating in a peer-to-peer mode or independent mode. In some other examples, the AP 102 may be a software AP (SoftAP) operating on a computer system.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a media access control (MAC) address of the AP 102. The AP 102 periodically broadcasts beacon frames ("beacons") including the BS SID to enable any STAs 104 within wireless range of the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP. The AP 102 may provide access to external networks to various STAs 104 in the WLAN via respective communication links 106. To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (Tus) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 107. Additionally, two STAs 104 may communicate via a direct communication link 107 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 107 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of standards (such as that defined by the IEEE 802.11-2016 specification or amendments thereof including, but not limited to, 802.11aa, 802.11ah, 802.11aq, 802.11ad, 802.11ay, 802.11ax, 802.11az, 802.11ba, 802.11be, and later amendments). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs).

Each of the frequency bands may include multiple subbands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 6 GHz band, the 60 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each PPDU is a composite structure that includes a PHY preamble and a payload in the form of a PLCP service data unit (PSDU). For example, the PSDU may include a PLCP preamble and header as well as one or more MAC protocol data units (MPDUs). The information provided in the PHY preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
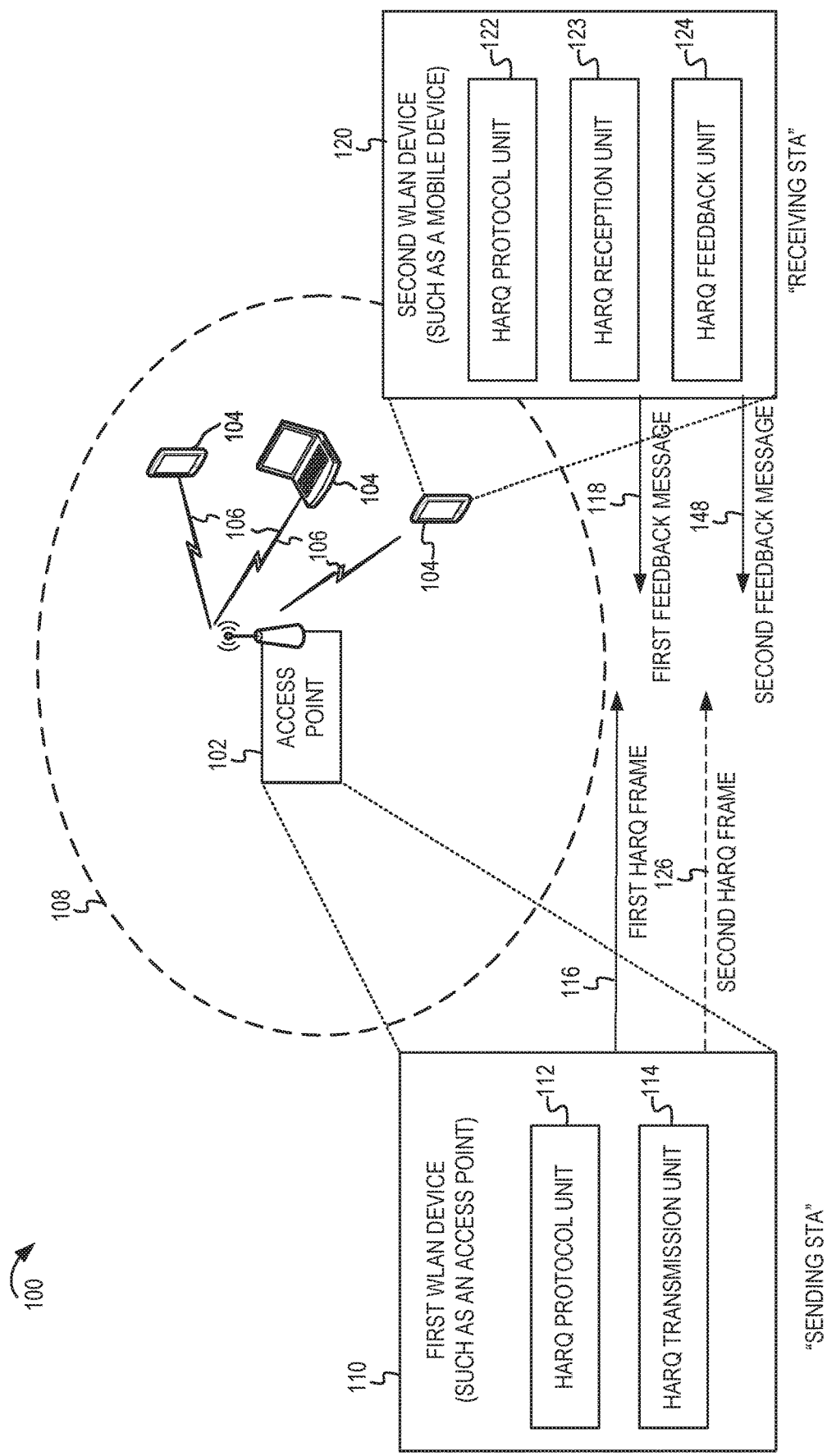
FIG. 2 depicts a system diagram of an example wireless local area network that implements a retransmission protocol, such as a hybrid automatic repeat request (HARQ) protocol.

FIG. 2 depicts a system diagram of an example wireless local area network that implements a retransmission protocol, such as a hybrid automatic repeat request (HARQ) protocol. The WLAN shown in FIG. 2 is based on the example WLAN described in FIG. 1. The AP 102 may be an example of a first WLAN device 110. Regardless of whether the first WLAN device 110 is an AP or a traditional STA, it may be referred to as a "sending STA" for the example HARQ processes in this disclosure. The STAs 104 may be examples of the second WLAN device 120 and may be referred to as a "receiving STA" in the example HARQ processes in this disclosure. To be clear, the designations of sending STA and receiving STA may be reversed in other example HARQ processes. The first WLAN device 110 also may be referred to as a HARQ transmitter (or H-TX) because it is the source of HARQ transmissions to the second WLAN device 120. The second WLAN device 120 may be referred to as a HARQ receiver (or H-RX) because it is the recipient of the HARQ transmissions from the first WLAN device 110.

A HARQ transmission may include multiple HARQ frames. In the example of FIG. 2, the first WLAN device 110 may send a first HARQ frame 116 116 to the second WLAN device 120 and the second WLAN device 120 may respond with a first feedback message 118. The first HARQ frame 116 may include initial transmissions of a first set of FEC codewords. Based on the first feedback message 118, the first WLAN device 110 may determine which FEC codewords from the first set of codewords had a decoding failure at the second WLAN device 120. The second HARQ frame 126 may include retransmissions regarding the failed FEC codewords. In some implementations, the second HARQ frame 126 also may include initial transmissions of a second set of FEC codewords. In this disclosure, we describe examples of a PPDU that may contain an MPDU or an A-MPDU that is addressed to a receiving STA. The examples described in this disclosure also may be applicable in the cases where the transmitted PPDU may contain more than one PSDU, each of which is addressed to independent receiving STAs, or generated by independent sending STAs.

The first WLAN device 110 (as sending STA) may include a HARQ protocol unit 112 and a HARQ transmission unit 114. The HARQ protocol unit 112 may implement a HARQ protocol in accordance with aspects of this disclosure. The HARQ transmission unit 114 may prepare and communicate the HARQ frames 116 and 126. The second WLAN device 120 (as receiving STA) may include a HARQ protocol unit 122, a HARQ reception unit 123 and a HARQ feedback unit 124. The HARQ protocol unit 122 may implement the HARQ protocol in accordance with aspects of this disclosure. The HARQ reception unit 123 may receive, decode, and process the HARQ frames 116 and 126. The HARQ feedback unit 124 may prepare and communicate the feedback messages 118 and 148. In some implementations, the first feedback message 118 may be a HARQ feedback message while the second feedback message 148 may be a MAC-layer acknowledgement (such as following a last HARQ frame of the HARQ process).

In some implementations, the HARQ protocol may allow the receiving STA (such as the second WLAN device 120) to control memory management aspects for HARQ transmission between a sending STA (such as the first WLAN device 110) and the receiving STA. In some implementations, the second WLAN device 120 may control the amount of memory that is allocated for HARQ transmissions. The second WLAN device 120 may process one HARQ stream or multiple HARQ streams concurrently. Each of the HARQ streams (and other applications and processes executing at the second WLAN device 120) may utilize a portion of the memory available at the second WLAN device 120. Further, to implement the HARQ protocol, the second WLAN device 120 may utilize additional memory to store information (such as codewords, for example) associated with the failed portions of a HARQ transmission (such as portions that were not properly decoded). For example, in a HARQ stream, the second WLAN device 120 may store the information while the second WLAN device 120 waits to receive a second HARQ transmission having information that can be combined with the stored information to decode the portion of the first HARQ transmission that previously failed. Thus, for a single HARQ stream, the second WLAN device 120 may allocate an amount of memory to process a HARQ transmission, which may be up to a maximum amount of memory equal to the payload of the corresponding PPDU. For multiple HARQ streams, the maximum amount of memory that may be allocated to processes HARQ transmissions for the multiple HARQ streams may be a multiple of the maximum amount of memory that is allocated for a single HARQ stream. For example, if the second WLAN device 120 is processing eight HARQ streams, the second WLAN device 120 may receive up to eight PPDUs, each of which includes an A-MPDUs with different MPDUs (for example, one or more MPDUs for each HARQ stream). The size of the memory to store the information of the PPDUs for eight HARQ streams (and therefore the maximum amount of memory that may be allocated for the HARQ protocol) may be eight times the size of the PPDU that includes a single MPDU for a single HARQ stream, which may be unmanageable for a receiving STA. For a receiving AP, multiple STAs may send HARQ transmissions to the AP, and each STA may separately send HARQ transmissions for one HARQ stream or multiple HARQ streams, and therefore the memory requirement also may be unmanageable for the AP for similar reasons.

In some implementations, the second WLAN device 120 (as the receiving STA) may control the amount of memory that is allocated for each HARQ transmission of one or more HARQ streams. For example, the second WLAN device 120 may control the amount of memory that is allocated on a per PPDU basis or a per TXOP basis to implement the HARQ protocol. A receiver processing capability of the second WLAN device 120 may be based on the amount of memory allocated for HARQ transmission or a codeword processing rate of the second WLAN device 120. In some implementations, the first feedback message 118, such as a HARQ acknowledgement (H-ACK) message, may indicate the receiver processing capability or an amount of remaining FEC codewords of the first HARQ frame 116 that the second WLAN device 120 has not yet attempted to decode. In some implementations, the first feedback message 118 may include a HARQ status report. In some implementations, the HARQ status report may be present in the MAC header or the PHY header of the first feedback message 118. In some implementations, the HARQ status report may include signal-to-noise ratio (SNR) information, or a combination of suggested quadrature amplitude modulation (QAM) and suggested puncturing ratio in the next transmission or retransmission for rate adaptation in HARQ. The rate adaptation in HARQ may be used to improve packet error rate (PER), or ease the core processing burden of the low-density parity-check (LDPC) decoder (such as by suggesting a slower transmission rate).

In some implementations, the second WLAN device 120 may indicate the receiver processing capability for HARQ transmissions on a per association basis. For example, during the association process between the second WLAN device 120 and the first WLAN device 110, the second WLAN device 120 may indicate the codeword processing rate of the amount of memory that will be allocated for each HARQ transmission or for all HARQ transmissions (after the association process) in a management frame (such as Association Request/Response, Probe Request/Response, etc.). The indication may be included in an EHT Capabilities element, in a HARQ Parameters, or in a HARQ Control element contained in the management frame. Such an element may contain all information/parameters that are related to the HARQ protocol (which may be referred to as HARQ control information), such as support/enablement, memory, HARQ mode (such as Chase combining, increased redundancy, HARQ feedback size, fast feedback mechanism support, max HARQ PPDU size support, etc.). In some implementations, a control field (such as a HARQ Control field or element) contained in the MAC header of frames transmitted by the second WLAN device 120 may contain one or more of these parameters. In some implementations, the control field may be carried in the HT Control field of the frame or in the EHT Control field of the frame. In some implementations, the H-ACK frame may contain the HARQ Control field or element described herein. The first WLAN device 110 may receive the frame (for example, a frame that includes the HARQ Control field or element) and determine the amount of memory that the second WLAN device 120 will allocate for each HARQ transmission. The first WLAN device 110 may generate each of the HARQ frames (such as HARQ PPDUs) that will be sent to the second WLAN device 120 based on the receiver processing status or receiver processing capability indicated in the most recently received frame that includes HARQ control information.

In some implementations, when the second WLAN device 120 receives a HARQ frame, the second WLAN device 120 may respond with a feedback message that includes one or more MPDU-level BA bitmaps, or one or more codeword-level BA bitmaps, or both. An MPDU-level BA bitmap may indicate the receive status of one or more MPDUs, including that of each of the MPDUs that the second WLAN device 120 received in the HARQ PPDU. In some implementations, the H-BA also may include one or more codeword-level BA bitmaps. Each codeword-level BA bitmap may indicate the receive status of one or more codewords sets of the HARQ PPDU, where each codeword set is identified with a starting codeword index (or codeword starting number), and optionally a codeword bitmap (which also me be referred to as CW bitmap). In some implementations, the second WLAN device 120 may not include the receive status of a codeword set if the MPDU-level BA bitmap includes the receive status of the MPDU(s) contained in that codeword set, and vice versa. In some implementations, in a second HARQ frame that is sent to the second WLAN device 120, the first WLAN device 110 may include information (such as codewords) for decoding a failed portion of the first HARQ frame, and also may include additional MPDUs, (such as MPDUs that have not been previously sent to the second WLAN device 120). The second WLAN device 120 may receive the second HARQ frame and determine to respond with an H-BA message that includes one or more codeword-level BA bitmaps and one or more MPDU-level BA bitmaps. The one or more codeword-level BA bitmaps may be used to indicate the successful and unsuccessful reception of the codewords, and the MPDU-level BA bitmaps may be used to indicate the successful and unsuccessful reception of the additional MPDUs. In some implementations, the mapping between each bit of a codeword bitmap and the codeword set may be negotiable during association or during the BA setup. For example, the mapping may specify that one bit of the codeword bitmap maps to one codeword, that one bit of the codeword bitmap maps to two codewords, and so on. Furthermore, in some implementations, the codeword bitmap may provide receive status information about the codeword set, or can include signaling for the codeword set (such as based on one or more bits of the codeword bitmap).

Figure 3:
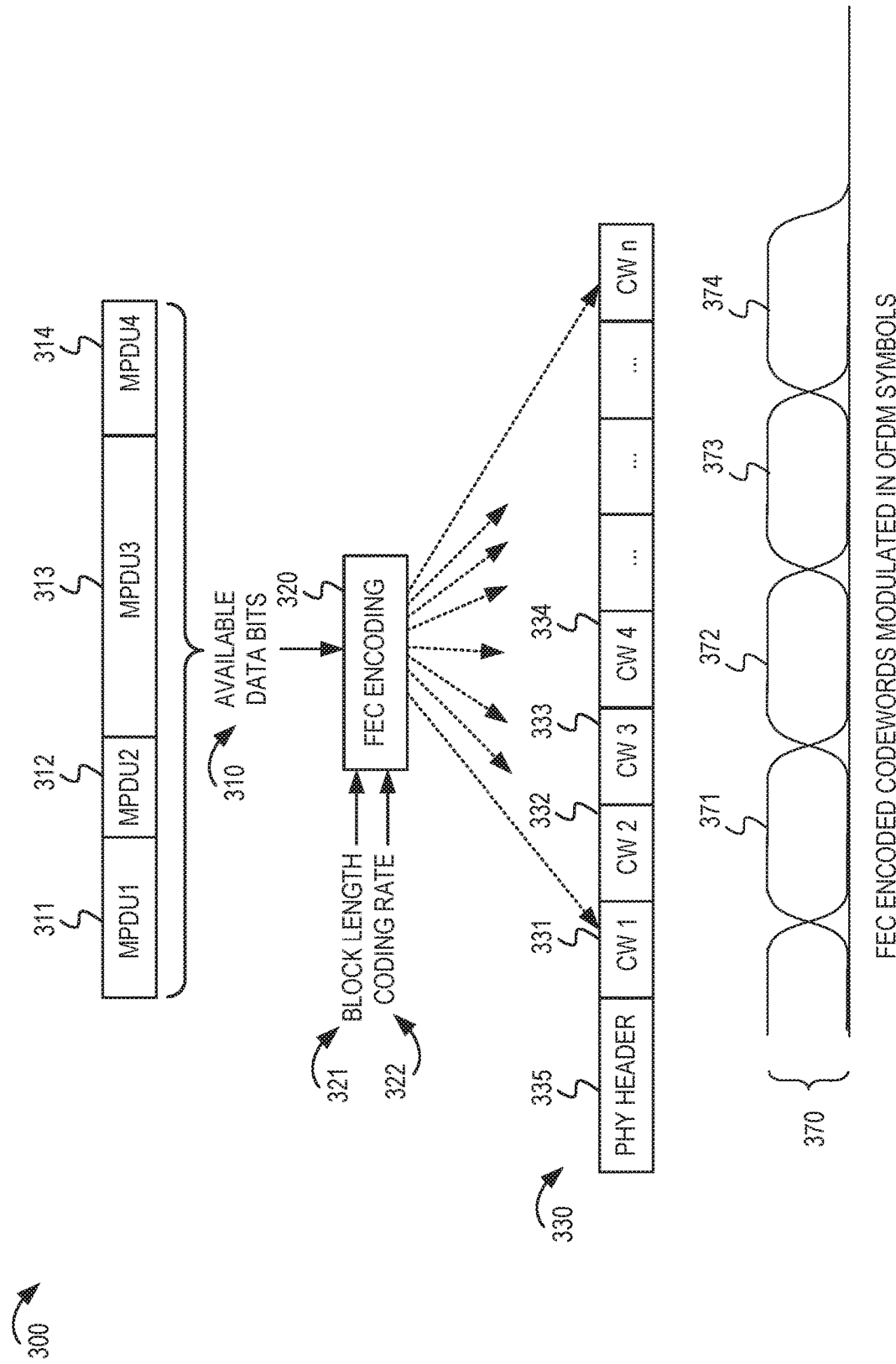
FIG. 3 depicts an example forward error correction (FEC) encoding process to distinguish between media access control (MAC) layer protocol data units (MPDUs) and a physical (PHY) protocol data unit (PPDU) with FEC codewords.

FIG. 3 depicts an example FEC encoding process to distinguish between MAC layer protocol data units (MPDUs) and a PHY protocol data unit (PPDU) with FEC codewords. As an input to the FEC encoding process 300, a series of MPDUs 311, 312, 313, and 214 may be collectively referred to as source data having a series of available data bits 310 for FEC encoding. The FEC encoding process 320 may take blocks of the available data bits 310 based on a block length 321 parameter. Additionally, a coding rate 322 may affect how the FEC encoding process 320 processes the blocks of available data bits 310. For each block of available bits, the FEC encoding process 320 may determine a codeword. The FEC encoding process 320 can be used to populate a PPDU 330 with one or more codewords (such as codewords 331, 332, 333, and 234). A physical layer header 335 also may prepend the codewords. The quantity and length of the codewords (such as the codewords 331, 332, 333, and 244) in the PPDU 330 may be determined based on the number of available data bits 310 and the coding rate 322.

One example FEC encoding process may be based on LDPC encoding. There may be many alternative implementations of FEC encoding. LDPC is generally well known in the art. For example, IEEE Std 802.11-2016 includes a thorough explanation of LDPC encoding. The LDPC encoding may be systematic, such that it encodes an information block, c=(i0, i1, . . . , i(k−1)), of size k, into a codeword, c, of size n, c=(i0, i1, . . . i(k−1), p0, p1, . . . , p(n−k−1)), by adding n−k parity bits. The parity bits are calculated using LDPC parity-check matrices. Example coding rates, information block lengths, and codeword block lengths are described in Table 1.

TABLE 1

| Coding Rate (R) | LDPC information block length (available bits) | LDPC codeword block length (codeword bits) |
| --- | --- | --- |
| 1/2 | 972 | 1944 |
| 1/2 | 648 | 1296 |
| 1/2 | 324 | 648 |
| 2/3 | 1296 | 1944 |
| 2/3 | 864 | 1296 |
| 2/3 | 432 | 648 |
| 3/4 | 1458 | 1944 |
| 3/4 | 972 | 1296 |
| 3/4 | 486 | 648 |
| 5/6 | 1620 | 1944 |
| 5/6 | 1080 | 1296 |
| 5/6 | 540 | 648 |

The quantity and length of the LDPC codewords (such as the codewords 231, 232, 233, and 244 in the PPDU 230) may be determined based on the number of available data bits 210 and the coding rate 222. Example parameters are described in Table 2.

TABLE 2

| Range of $N_{avbits}$ (bits) | Number of LDPC codewords in PPDU | LDPC codeword length (each codeword) |
| --- | --- | --- |
| $N_{avbits} \leq 648$ | 1 | 1296, if $N_{avbits} \geq N_{pld}$ + 912 × (1 − R) 648, otherwise |
| $648 < N_{avbits} \leq 1296$ | 1 | 1944, if $N_{avbits} \geq N_{pld}$ + 1464 × (1 − R) 1296, otherwise |
| $1296 < N_{avbits} \leq 1944$ | 1 | 1944 |
| $1944 < N_{avbits} < 2592$ | 2 | 1944, if $N_{avbits} \geq N_{pld}$ + 2916 × (1 − R) 1296, otherwise |
| $2592 < N_{avbits}$ | $\left\lceil \dfrac{N_{pld}}{1944 \times R} \right\rceil$ | 1944 |

The available data bits may be padded to fill a number of bits in a payload of a PPDU ($N_{pld}$ may be the number of bits in a PSDU and SERVICE field to include in the PPDU). After adding padding (also referred to as shortening bits), the distributed (segmented) into codeword blocks for LDPC encoding and puncturing. For example, parity bits may be added to the data bits and padding. The shortening bits may be discarded after the LDPC encoding. Furthermore, the parity bits may be punctured. Typically, puncturing involves discarding some of the parity bits to reduce the size of the codeword. After puncturing, in some implementations, a first portion of the codeword may be repeated in a last portion of the codeword.

In some implementations, a first WLAN device may store the original data or the original FEC codeword before puncturing. For example, a retransmission regarding the FEC codeword may include the data encoded using a different coding rate, may include additional repeated bits for a codeword, may include the original FEC codeword using a different puncturing rate, or may include the punctured bits that were removed from the first set of parity bits. In some implementations, the first WLAN device may use a different coding rate (to generate different parity bits) based on the same source data associated with an FEC codeword. Because the size of the FEC codewords and coding rates are specified (such as Table 1 and Table 2), the first WLAN device and the second WLAN device may use corresponding processes for encoding and decoding, respectively.

It should be apparent that the collection of MPDUs (such as MPDUs 311, 312, 313, and 214) may be distributed to different codewords (codewords 331, 332, 333, and 234). The boundaries between MPDUs and codewords may not be aligned. A single codeword may include data from multiple MPDUs. Furthermore, a single MPDU may span multiple codewords. In one aspect of this disclosure, a first WLAN device may maintain a mapping of which MPDUs have been encoded in which codewords. For example, if a second WLAN device indicates that MPDUs 311 and 312 were not properly received while MPDUs 313 and 214 were properly received, the first WLAN device may determine that the second WLAN device was unable to decode the first codeword 331. The first WLAN device may retransmit the first codeword 331 (possibly after puncturing or removing some bits). In some implementations, the first WLAN device may transmit additional parity bits for the first codeword 331 in a subsequent transmission. Furthermore, the subsequent transmission may not include a retransmission of data, but rather may include just the additional parity bits. The second WLAN device may combine the additional parity bits with the first set of parity bits in the first codeword 331 to decode the first codeword 331.

FIG. 3 also shows a relationship between the codewords and physical layer symbols. FEC encoded blocks may be transmitted using a modulation waveform 370 having one or more modulation symbols, such as modulation symbols 371, 372, 373, and 274. In one example, the modulation symbols may comprise orthogonal frequency division multiplexing (OFDM) symbols or other symbols. OFDM is a multicarrier technology in which every OFDM symbol is comprised of many carriers. Each carrier can potentially carry a different number of bits of information depending on the channel quality for the carrier. Each symbol may comprise a group of bits from the PPDU. Depending on the PHY layer configuration, each symbol may include a portion of a codeword, a full codeword, or more than one codeword.

Figure 4:
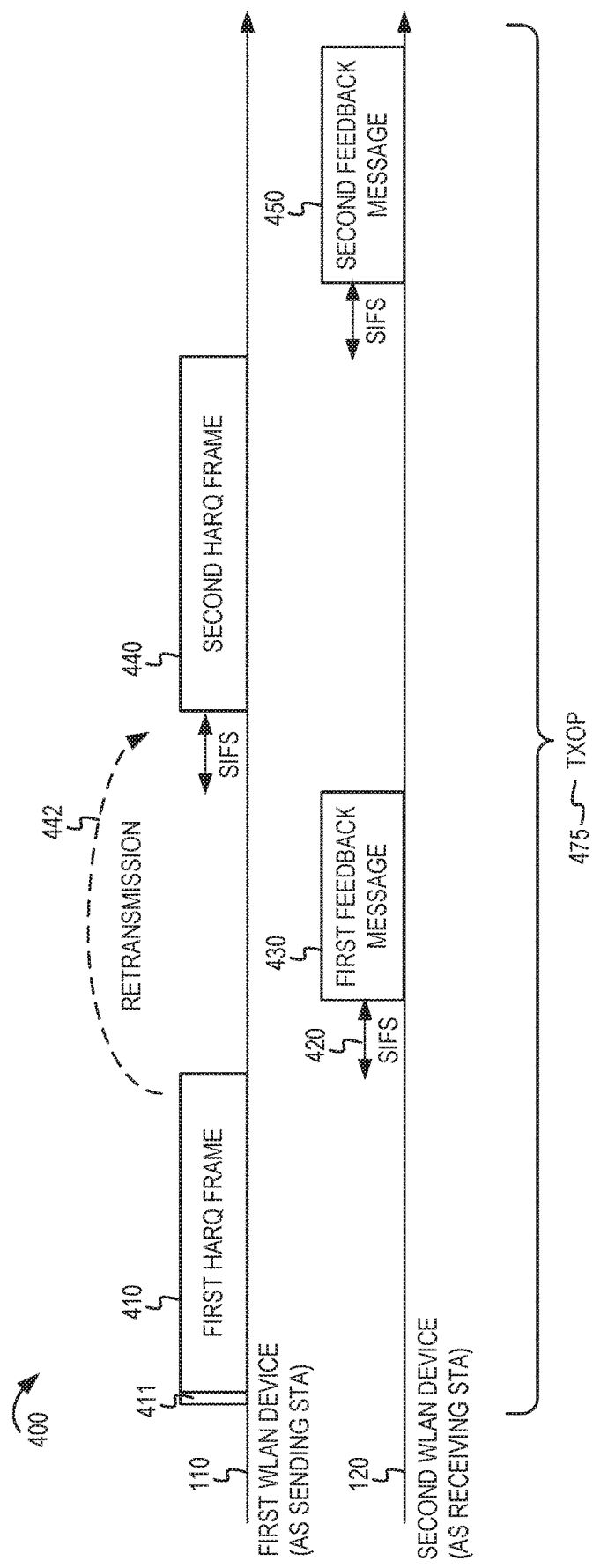
FIG. 4 depicts an example HARQ transmission having multiple HARQ frames according to a HARQ protocol.

FIG. 4 depicts an example HARQ transmission having multiple HARQ frames according to a HARQ protocol. The HARQ transmission also may be referred to as a HARQ process. A HARQ process 400 may begin with a first HARQ frame 410 from the first WLAN device 110 to the second WLAN device 120. The first HARQ frame 410 may be the initial PPDU or packet in the HARQ exchange for a particular TXOP 475. The first HARQ frame 410 may include initial transmissions of a first set of FEC codewords. The first HARQ frame 410 may include a HARQ indicator (such as a bit, field, or sub-field in a PHY header 411) to indicate that the transmission is a HARQ transmission. For example, a bit in the PHY header 411 may be set to 1 if the first HARQ frame is a HARQ transmission, or the bit may be set to 0 if the first HARQ frame is a non-HARQ transmission.

In response to the first HARQ frame 410, the second WLAN device 120 may send the first feedback message 430 (such as an H-BA message) back to the first WLAN device 110. The first feedback message 430 may begin after a short interframe space (SIFS) 420, which represents a determinable time period to maintain synchronization in the WLAN. The first feedback message 430 may include an indicator (such as a bit, field, or sub-field in the PHY header 411) to indicate whether the first feedback message 430 is an H-ACK message or a non-HARQ ACK message. As described in FIG. 2, the first feedback message also may include receiver processing capability, HARQ status, or receiver processing status. For example, the first feedback message 430 may include memory management information to indicate the amount of memory that is allocated (or remaining memory, or both) by the second WLAN device 120 for processing codewords of a subsequent HARQ frame (such as the second HARQ frame 440). In some implementations, the second WLAN device 120 also may control the number of HARQ frames that may be transmitted within a TXOP (such as the TXOP 475). For example, in addition to the initial HARQ frame (such as the first HARQ frame 410), one or more additional HARQ frames may be transmitted from the first WLAN device 110 to the second WLAN device 120 during a particular TXOP to try to decode and recover the codewords of the first HARQ frame 410 that failed. The first feedback message 430 may include a PPDU indicator in a control field to indicate a maximum number of HARQ frames that can be transmitted within a TXOP (such as a maximum number of two HARQ frames).

In response to receiving the first feedback message 430, the first WLAN device 110 may send the second HARQ frame 440 to the second WLAN device 120 (such as after a SIFS period). The second HARQ frame 440 may represent a retransmission 442 of a least a portion of the first HARQ frame 410 or information (such as codewords) that will be used to try to decode and recover the portions of the first HARQ frame 410 that failed. For example, the second HARQ frame 440 may include retransmissions regarding the FEC codewords that were indicated in the first feedback message 430 has having a decoding failure. As described above, the FEC codewords with decoding failure are those which the second WLAN device 120 has attempted to decode but has failed to decode, but may not include those FEC codewords that the second WLAN device 120 has not yet attempted to decode before the time for the first feedback message 430. In some implementations, the second HARQ frame 440 may contain a shorter PHY header compared to the first HARQ frame 410. For example, the second HARQ frame 440 may not include identifiers and other redundant information that was already contained in the first HARQ frame 410.

In this disclosure, retransmissions of FEC codewords may be the original FEC codeword or another representation of the FEC codeword. For example, the retransmission may be a new FEC codeword (potentially using a different coding rate or with additional repeated bits) that is based on the same source data as the original FEC codeword. Alternatively, the retransmission may be based on the original FEC codeword, but with a different puncturing rate. The retransmissions may be based on a Chase combining or incremental redundancy representation of the data which can improve the ability of the second WLAN device 120 to decode the failed FEC codewords in a subsequent attempt.

In some implementations, the second HARQ frame 440 may include both the retransmissions of the failed FEC codewords indicated in the first feedback message 430 and initial transmissions for a second set of FEC codewords. The second HARQ frame 440 may include signaling (such as in the preamble) to indicate a length, size, quantity of codewords, or other information that indicates how much of the second HARQ frame 440 contains retransmissions. In some implementations, the retransmissions may be included in the second HARQ frame 440 first, followed by the initial transmissions of the next set of FEC codewords.

Following the second HARQ frame 440, the second WLAN device 120 may send a second feedback message 450 (such as after a SIFS period). The second feedback message 450 may be formatted similar to the first feedback message 430 of may have a different format. In some implementations, when the second WLAN device 120 has successfully recovered the MPDUs for the HARQ transmission (from multiple HARQ frames), or when the maximum number of HARQ frames have been transmitted within the TXOP 475, the second feedback message 450 may be an MPDU-level ACK or MPDU-level Block ACK message. In some implementations, if the second feedback message 450 is an MPDU-level ACK or MPDU-level Block Ack message, the second feedback message 450 may not contain a codeword-level BA bitmap. In the example shown in FIG. 5, the second feedback message 450 may complete the HARQ process 400.

Figure 5:
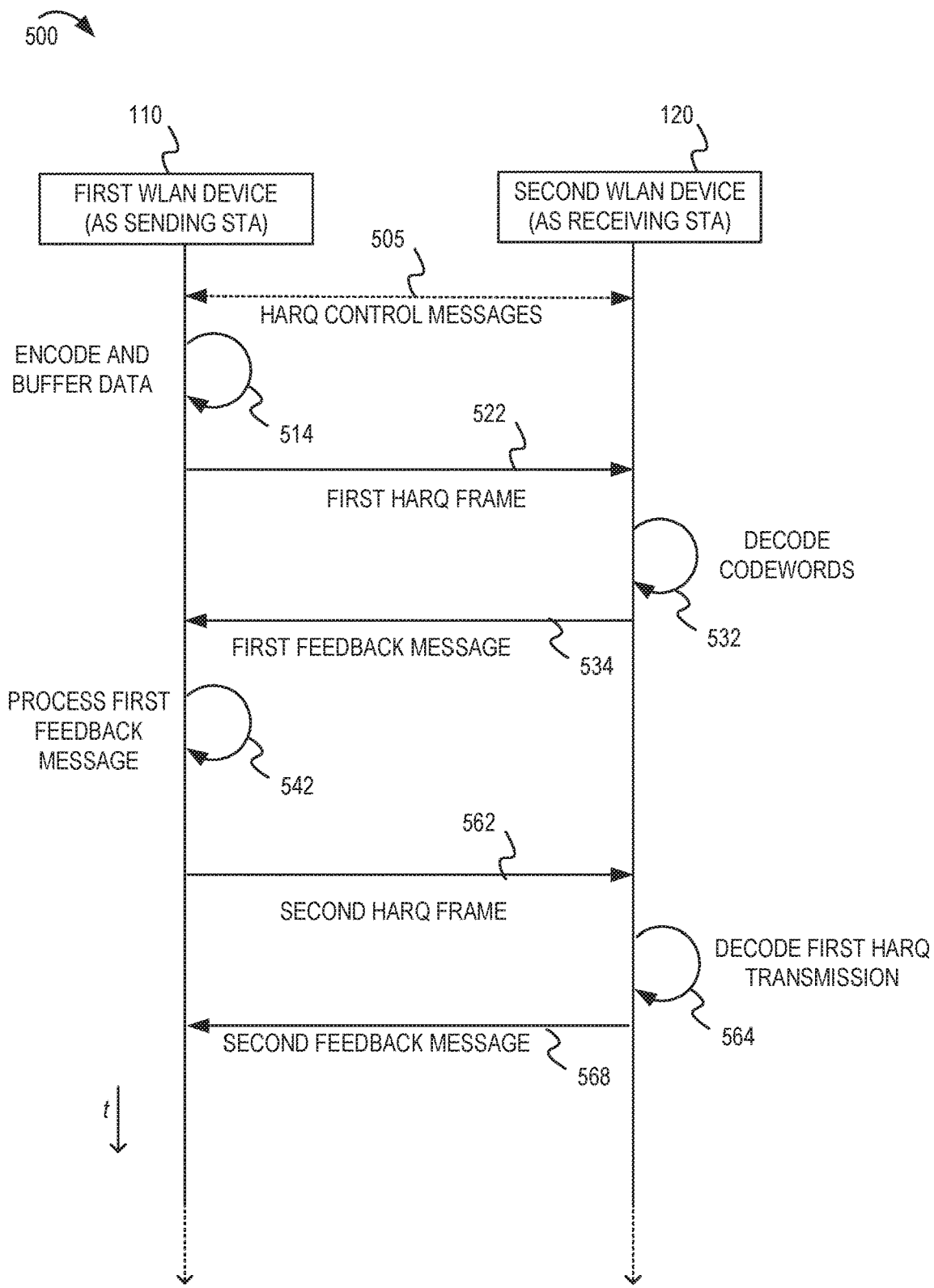
FIG. 5 depicts an example message flow diagram associated with a HARQ protocol.

FIG. 5 depicts an example message flow diagram associated with a HARQ protocol. The example message flow 500 shows the first WLAN device 110 (as the sending STA) and the second WLAN device 120 (as the receiving STA). The first WLAN device 110 and the second WLAN device 120 may optionally exchange control messages 505, such as HARQ configuration or setup messages.

At process 514, the first WLAN device 110 may encode and buffer a first set of data for the HARQ sequence. The first HARQ frame 522 may include an MPDU or multiple MPDUs or segments of the first set of data. The first HARQ frame 522 may include initial transmissions of a first set of FEC codewords. The first WLAN device 110 also may determine the information (such as the ACK policy or HARQ control information) to include in the PHY header of the first HARQ frame 522. At process 532, the second WLAN device 120 may receive and process the first HARQ frame 522 from the first WLAN device 110. For example, the second WLAN device 120 may attempt to decode FEC codewords included in the first HARQ frame 522. The second WLAN device 120 may send the first feedback message 534 (such as an H-BA message) to the first WLAN device 110. The first feedback message 534 may indicate which FEC codewords of the first set of FEC codewords failed to decode. In some implementations, the first feedback message 534 may include a bitmap having bits that correspond to an ordering of the first set of FEC codewords. The first feedback message 534 also may include a value indicating the first failed FEC codeword that the second WLAN device 120 failed to decode. The bitmap may begin with a bit for the first failed FEC codeword (or a bit for the next FEC codeword following the first failed FEC codeword). Thus, FEC codewords before the first failed FEC codewords can be implicitly acknowledged while keeping the first feedback message 534 shorter. In some implementations, the bitmap may be a variable length and the first feedback message 534 may include a header to indicate a length of the bitmap.

In some implementations, the first feedback message 534 also may include additional information to assist the direct wireless links 107 in determining a proper modulation order, coding, puncturing, quantity of repeated code bits or other rate for the second HARQ frame. For example, the additional information may be related to channel conditions, receiver processing capability, or receiver processing status, among other examples. In some implementations, the additional information may be a value to change a HARQ protocol parameter. Alternatively, or additionally, the additional information may be based on how many codewords of the first set of FEC codewords that are still pending processing by the second WLAN device 120 at the time that the first feedback message 534 is generated by the second WLAN device 120.

At process 542, the first WLAN device 110 may process the first feedback message 534 received from the second WLAN device 120 and prepare a second HARQ frame 562. The second HARQ frame 562 may include retransmissions of the failed FEC codewords indicated in the first feedback message 534. In some implementations, the second HARQ frame 562 also may include initial transmissions of a second set of FEC codewords.

At process 564, following the second HARQ frame 562, the second WLAN device 120 may use the information of the second HARQ frame 562 to decode and recover the remaining portions of the first HARQ frame 522 that previously failed. The second WLAN device 120 may then send a second feedback message 568. In some implementations, the second feedback message 568 may be an MPDU-level ACK or MPDU-level block ACK message to the first WLAN device 110, and may end the HARQ sequence.

Figure 6:
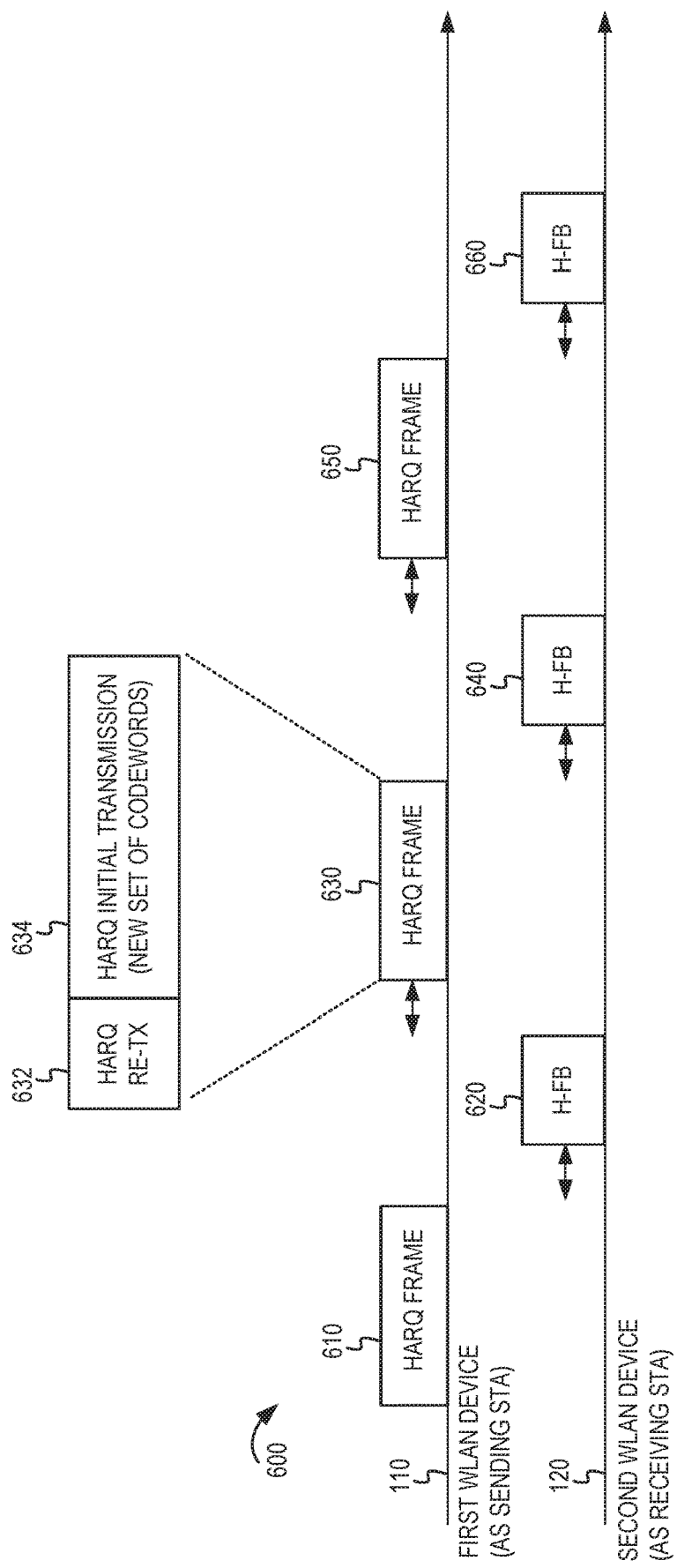
FIG. 6 depicts example HARQ transmission with multiple HARQ frames and the use of a HARQ frame that includes both a retransmission portion and initial transmission.

FIG. 6 depicts example HARQ transmission 600 with multiple HARQ frames and the use of a HARQ frame that includes both a retransmission portion and initial transmission. In FIG. 6, a direct wireless links 107 (acting as sending STA) is communicating data to a second WLAN device 120 (as receiving STA). A first HARQ frame 610 may be sent to the second WLAN device 120 and may include a first set of FEC codewords. The second WLAN device 120 may respond with a HARQ feedback (H-FB) 620 indicating which FEC codewords of the first HARQ frame 610 failed to decode. In a second HARQ frame 630, the direct wireless links 107 may include a HARQ retransmission 632 of the failed codewords, as well as initial transmissions 634 of a second set of FEC codewords.

The second WLAN device 120 may send a H-FB 640 to indicate status of the decoding. For example, the H-FB 640 may indicate decoding failures of particular FEC codewords from among the first set of FEC codewords (from the first HARQ frame 610 and the HARQ retransmissions 632) and the second set of FEC codewords (from the initial transmissions 634 in the second HARQ frame 630). The HARQ process may continue with alternating HARQ frames and H-FB messages while there is still data to send via the HARQ transmission or until a transmission opportunity ends.

By combining retransmissions and initial transmissions in some of the HARQ frames, the HARQ process can be made more efficient. Each H-FB may include indications of which FEC codewords have failed to decode. The direct wireless links 107 may continue to include retransmissions of the failed codewords until a codeword transmission limit is reached. In some implementations, the second WLAN device 120 may indicate the codeword transmission limit in one of the H-FB messages or in a HARQ control message (not shown).

Figure 7:
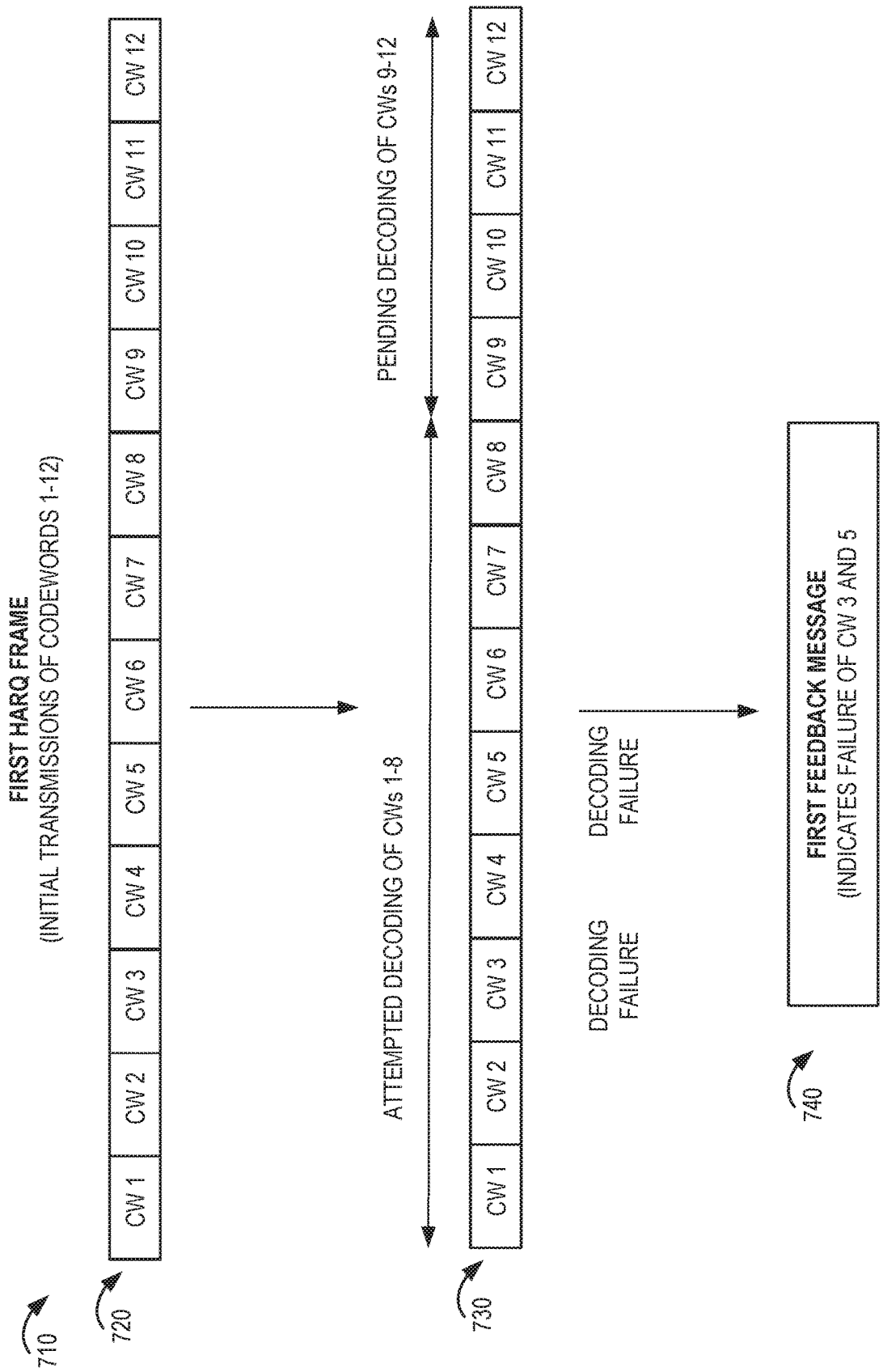
FIG. 7 depicts an example first HARQ frame and an example first feedback message based on decoding status of the first HARQ frame.

FIG. 7 depicts an example first HARQ frame and an example first feedback message based on decoding status of the first HARQ frame. A first HARQ frame 710 may include a first set of FEC codewords 720 (numbered codeword 1 to codeword 12 in the figure, for reference purposes only). FIG. 7 shows the results 730 of a decoding process by the second WLAN device 120. By the time that the second WLAN device 120 is required to send a feedback message, the second WLAN device 120 may have attempted to decode codewords 1 through 8 but may not have attempted or completed decoding of codewords 9 through 12. In the example of FIG. 7, the second WLAN device 120 determined a decoding failure of codewords 3 and 5. Therefore, the second WLAN device 120 may send a first feedback message 740 that indicates a decoding failure of codewords 3 and 5. Note that the first feedback message 740 may not include a decoding status regarding codewords 9 through 12. Any decoding failures for those codewords may be included in a subsequent feedback message (not shown). By refraining from including a negative acknowledgement of codewords 9-12, the second WLAN device 120 may prevent the direct wireless links 107 from retransmitting those codewords which could be redundant or unnecessary by the time the retransmission is received. The second WLAN device 120 may continue to attempt to decode codewords 9-12 while the direct wireless links 107 prepares and sends a next HARQ frame.

Figure 8:
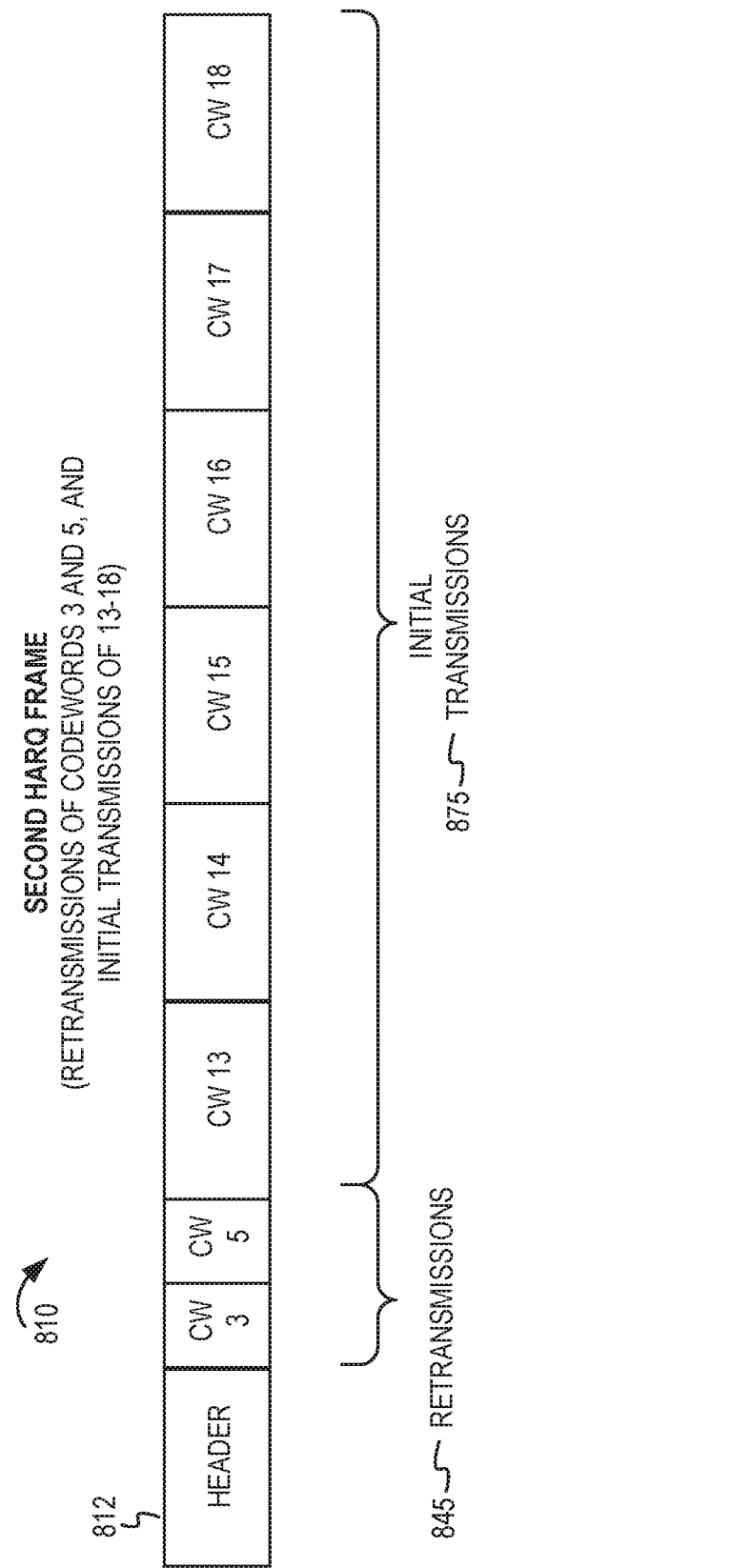
FIG. 8 depicts an example second HARQ frame based on the first feedback message in FIG. 7.

FIG. 8 depicts an example second HARQ frame 810 based on the first feedback message in FIG. 7. The second HARQ frame 810 may include retransmissions 845 of the failed codewords (codewords 3 and 5) indicated in the first feedback message of FIG. 7. The second HARQ frame 810 also may include initial transmissions 875 of a new set of codewords (numbered codeword 13 to codeword 18 in the figure, for reference only). In some implementations, the size of the retransmissions 845 may be smaller than the original FEC codewords 3 and 5 that were included in the first HARQ frame 710. For example, the retransmissions may have a different puncturing or coding rate, may have parity bits, quantity of repeated code bits, or may be partial retransmissions of those codewords.

In some implementations, the second HARQ frame 810 may include a header 812 or other signaling that can be used by the second WLAN device 120 to determine the boundary between the retransmissions 845 and the initial transmissions 875. For example, the header 812 may include a length or other value to indicate a size of the first portion of the second HARQ frame 810 that includes the retransmissions 845. In some implementations. The header 812 may include HARQ control information that informs the second WLAN device 120 regarding the coding rate, puncturing rate, or other information that the second WLAN device 120 can use to determine the size of the retransmissions 845.

In some implementations, the direct wireless links 107 may adjust a coding rate, puncturing rate, quantity of repeated code bits, modulation order, or other parameter of the second HARQ frame 810 based on the first feedback message. For example, the coding rate of the initial transmissions 875 may be more robust if there were many failed FEC codewords in the first HARQ frame. The coding rate may be more efficient (less robust) if there were few failed FEC codewords in the first HARQ frame. In some implementations, a field in the header 812 may indicate a change to the coding rate, puncturing rate, modulation order. The field may be specific to the retransmissions 845, to the initial transmissions 875, or for both.

In some implementations, the second HARQ frame 810 may include a boundary field (not shown) between the retransmissions 845 and the initial transmissions 875. For example, the boundary field may have a fixed pattern that can be recognized as a boundary between portions of the second HARQ frame 810.

Figure 9:
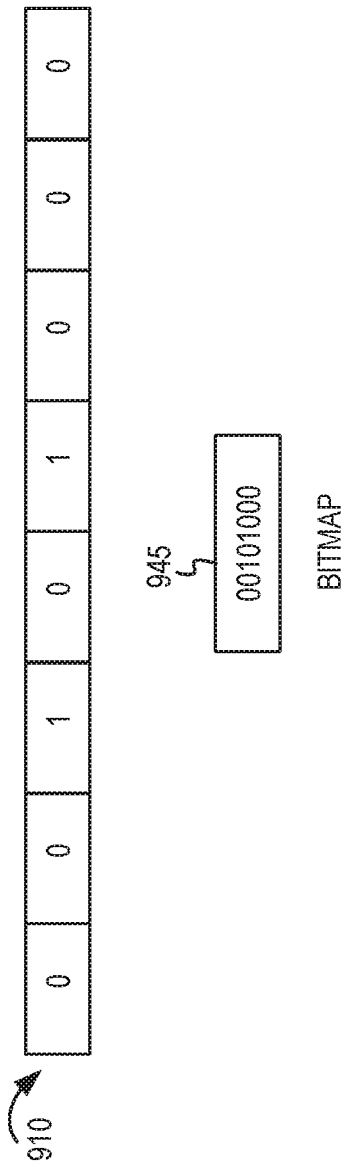
FIG. 9 depicts an example bitmap for providing feedback regarding a set of codewords.

FIG. 9 depicts an example bitmap for providing feedback regarding a set of codewords. The example of FIG. 9 is based on the first feedback message in FIG. 7. A series of ordered bits 910 may correspond to an ordering of the codewords 1-8. For example, since codewords 3 and 5 had decoding failures, there may be a first bit value (such as "1") to indicate the decoding failures in the bit positions that correspond to those codewords. The bits associated with the codewords that were successfully decoded may have a second value (such as "0"). Note that the use of "1" or "0" may be reversed, provided that the receiving STA and the sending STA use the same value meanings. The values and bit format may be standardized in a technical specification so that WLANs that implement the technical specification use the same value meanings. In some implementations, the bit pattern "00101000" (as shown in bitmap 945) may indicate successful decoding of codewords 1, 2, 4, and 6-7 and may indicate decoding failures of codewords 3 and 5.

Figure 10:
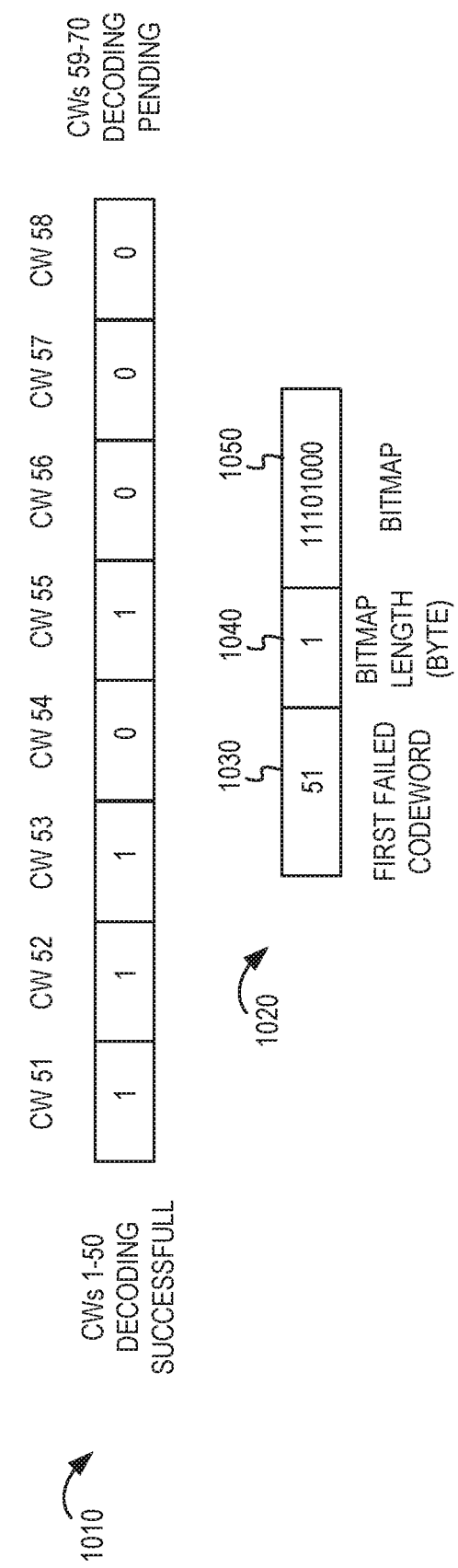
FIG. 10 depicts an example bitmap having a dynamic length and starting value.

FIG. 10 depicts an example bitmap having a dynamic length and starting value. In the example of FIG. 10, there may have been 70 codewords (shown at codeword sequence 1010) sent from a sending STA to the receiving STA. Codewords 1-50, 54, and 56-58 were successfully decoded while codewords 51-53 and 55 had decoding failures. Codewords 59-70 may be pending decoding and do not have a decoding success or decoding failure determined at the time that a first feedback message is to be sent the receiving STA.

FIG. 10 shows an improvement to a first feedback message that may reduce the size of the feedback message while still conveying the decoding status described for codewords 1-58. The technique is particularly useful when there are large sequences of successful decoding. In some typical wireless environments, decoding failures may be caused by temporary interference that impacts a sequence of failed FEC codewords among otherwise successfully decoded codewords.

The feedback message 1020 in FIG. 10 may include a field 1030 to indicate a first failed FEC codeword. For example, the value of field 1030 may be "51" to indicate that codeword 51 was the first failed FEC codeword and begins the truncated bitmap included in the bitmap field 1050. In some implementations, the bitmap field 1050 may begin with a first bit for the first failed codeword (as shown in FIG. 10). Alternatively, the first bit in the bitmap field 1050 may correspond to the next codeword (codeword 52) since the decoding failure of codeword 51 is already explicitly indicated in the field 1030.

A bitmap length field 1040 may indicate the length of the bitmap field 1050. For example, the bitmap length field 1040 may include a value that represents a number of octets, half octets, bits, or multiplier of a group of octets. In some implementations, a technical specification may define a variety of values for the bitmap length field 1040 that correspond to different predefined lengths of the bitmap field 1050.

In the example of FIG. 10, the bitmap field 1050 includes "11101000" to indicate a decoding failure of codewords 51-53 and 55 and decoding success of codewords 54 and 56-58.

Other options may be possible. For example, the feedback message may include a field (not shown) which indicates a highest codeword index which the first WLAN device has successfully decoded. Or the field (not shown) may be used by a receiving STA to indicate that it will no longer request codewords having an index below the value of the field. This may permit the sending STA to free up HARQ transmitter memory for codewords which the transmitter no longer will need for retransmission.

Figure 11:
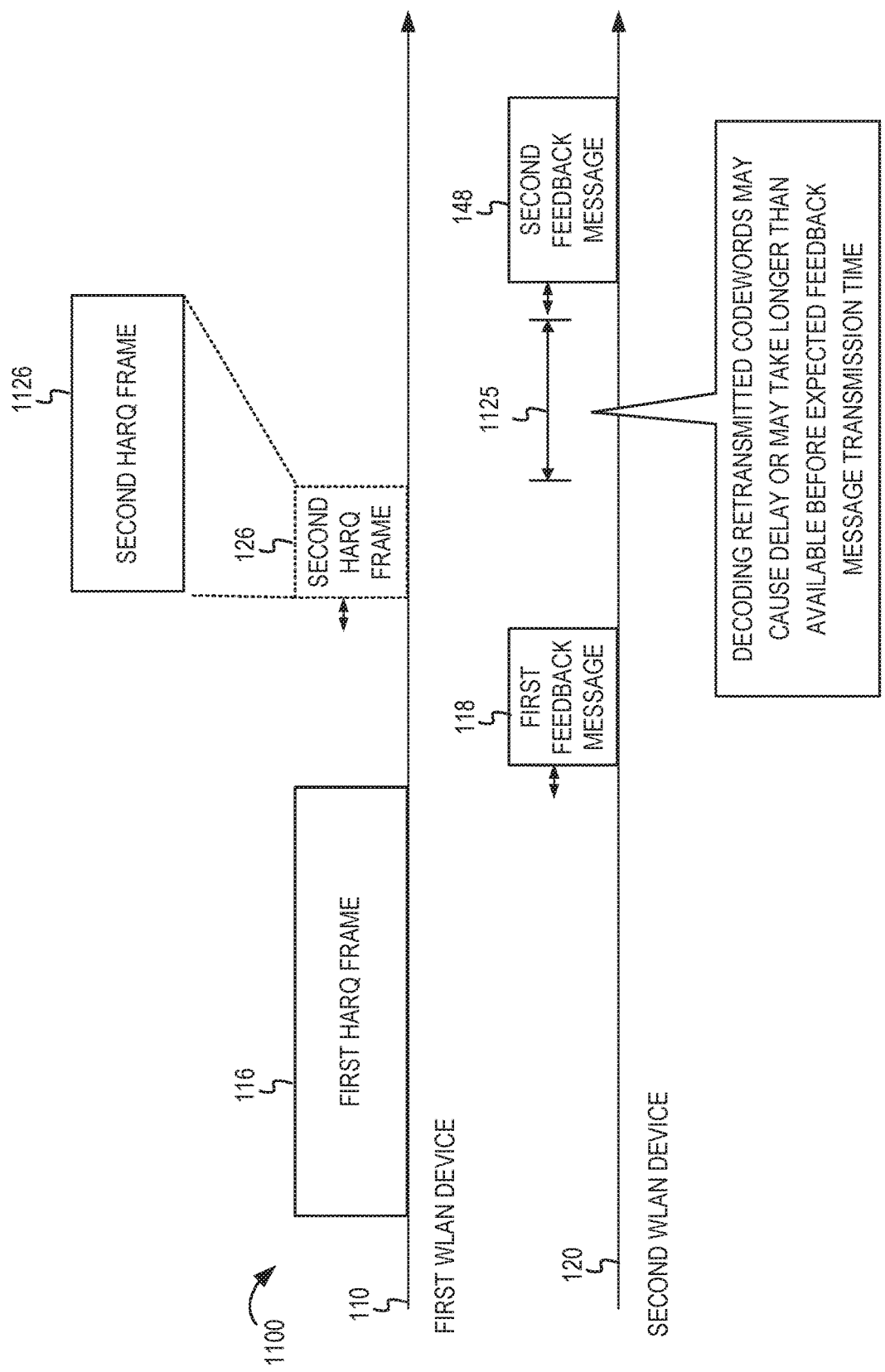
FIG. 11 depicts an example HARQ protocol which adapts a last HARQ frame based on receiver processing status or receiver processing capability.

FIG. 11 depicts an example HARQ protocol which adapts a last HARQ frame based on receiver processing status or receiver processing capability. A first HARQ frame 116 may include initial transmissions of one or more codewords. For example, the initial transmissions may include 80% of the coded bits (from the FEC encoding process) in the first HARQ frame. For example, the FEC codeword generated by the FEC encoding process 320 (FIG. 3) may be punctured so that the codewords in the first HARQ frame 116 contain 80% of the coded bits. Following the first HARQ frame 116, the HARQ feedback from the second WLAN device may indicate a failure to decode one or more of the initial transmissions. The second HARQ frame 126 may include retransmissions of the failed codewords. However, the retransmissions may include fewer bits (such as 20% of the coded bits) for the failed FEC codewords.

Current receivers are designed to decode codewords at a specific rate. The codeword processing rate may be based on a highest data rate that the STA supports. However, for a given data rate, the time to transmit the bits for a retransmitted codeword may be less than for standard transmissions when incremental redundancy or punctured Chase combining is used. This is because only some of the code bits in the codeword are retransmitted.

The receiving STA may attempt to decode the codewords based on the first HARQ frame. If decoding is unsuccessful, the STA may send back a feedback message indicating which codewords need more code bits. However, because the retransmitted code word may have fewer bits, the codeword processing rate would need to be much faster or more decoders would need to be implemented. The codeword processing rate may be limited based on receiver processing capability. The receiver processing capability may be dependent on hardware limitations, memory, or the like. It may not be possible or economically feasible to build the STA having a receiver processing capability that supports the fastest retransmission rate of the second HARQ frame protocol.

In the example of FIG. 11, the first feedback message 118 indicates that at least a first FEC codeword of the first HARQ frame 116 had a decoding failure. In response to a determination that the first FEC codeword was not successfully decoded, the first WLAN device 110 may prepare a second HARQ frame 126 that includes a retransmission corresponding to the first FEC codeword (as well as any other codewords from the first HARQ frame 116 that were not successfully decoded by the second WLAN device 120). In some implementations, the second HARQ frame 126 may include a punctured version of the original FEC codeword or may include different parity bits associated with the original FEC codeword.

Following the second HARQ frame 126, the second WLAN device 120 may attempt to decode the first FEC codeword (from the first HARQ frame 116) using the retransmitted codeword (from the second HARQ frame 126). For example, the second WLAN device 120 may combine the signals associated with the original and retransmitted codewords before performing signal processing on the codeword. Alternatively, the second WLAN device 120 may use the incremental redundancy information from the retransmitted codeword to decode the original codeword. In some implementations, the first WLAN device 110 may combine a set of parity bits (from the first HARQ frame 116) and a second set of parity bits (from the second HARQ frame 126) into a combined set of parity bits for an FEC decoding process. Following the processing of the second HARQ frame 126, the second WLAN device 120 may be configured to send a second feedback message 148 to indicate whether the first FEC codeword was successfully decoded. Alternatively, the second feedback message 148 may be a MAC layer acknowledgement for an MDPU included in the PSDU1.

According to the legacy retransmission protocol, the first WLAN device 110 may expect the second feedback message 148 immediately following an interframe space after the second HARQ frame 126. However, the second WLAN device 120 may not have sufficient receiver processing capability to process the second HARQ frame 126 before the expected time for the second feedback message 148. Decoding the second HARQ frame 126 may cause an unexpected delay, which may cause the first WLAN device 110 to assume that the second HARQ frame 126 was not properly received. In order to process the second HARQ frame 126 in time to transmit the second feedback message 148 at the expected time, the second WLAN device 120 may require additional decoders, processing capability, memory, or other resources that are unavailable to the second WLAN device 120.

In some implementations, the first WLAN device 110 may change a format of the second HARQ frame (shown as second HARQ frame 1126) so that the second HARQ frame 1126 has a sufficient duration for the second WLAN device 120 to decode the codewords and provide the second feedback message 148. For example, the direct wireless links 107 may reduce its transmission rate based on the receiver processing capability of the second WLAN device 120. In some implementations, the second WLAN device 120 may provide parameters to the first WLAN device 110 as part of an association process or HARQ configuration messaging. The parameters may be indicative of the receiver processing capability, such as a codeword processing rate (such as a quantity of codewords per time unit). If the first WLAN device 110 knows the receiver processing capability, the first WLAN device 110 may limit it's transmit rate to avoid exceeding the codeword processing rate of the second WLAN device 120. For example, the first WLAN device 110 may set a modulation and coding rate (MCS) below an upper limit so that the effective codeword processing rate is below the rate supported by the second WLAN device 120. In some implementations, the first WLAN device 110 may use a lower codeword puncturing rate for the second HARQ frame 126 (which results in a larger second HARQ frame 1126 size) to ensure that the codeword transmission rate is below the codeword processing rate of the second WLAN device 120. In some implementations, the first WLAN device 110 may send more repeated code bits or additional code bits in the retransmission to increase the reliability of the retransmission.

In some implementations, the direct wireless links 107 may determine that the second HARQ frame 126 is the last HARQ frame in the HARQ process. Upon determining that the second HARQ frame 126 is the last HARQ frame, the direct wireless links 107 may adjust the format of the second HARQ frame 126 (shown as the second HARQ frame 1126). In some implementations, the last HARQ frame may be prepared using a lower modulation order if the last HARQ frame includes initial transmissions of FEC codewords. The different format may include a change to bit rate, coding rate, puncturing rate, number of repeated code bits, or modulation order. The different format may be selected to provide additional time or greater reliability for the second WLAN device to process the last HARQ frame before a time for the second WLAN device to send a feedback message regarding the last HARQ frame.

In some implementations, the second WLAN device 120 may include a receiver processing status in the first feedback message 118. For example, the receiver processing status may indicate a time needed or quantity of codewords remaining to be decoded. The direct wireless links 107 may adjust the format of the second HARQ frame 1126 (to increase reliability or duration) based on the receiver processing status.

Figure 12:
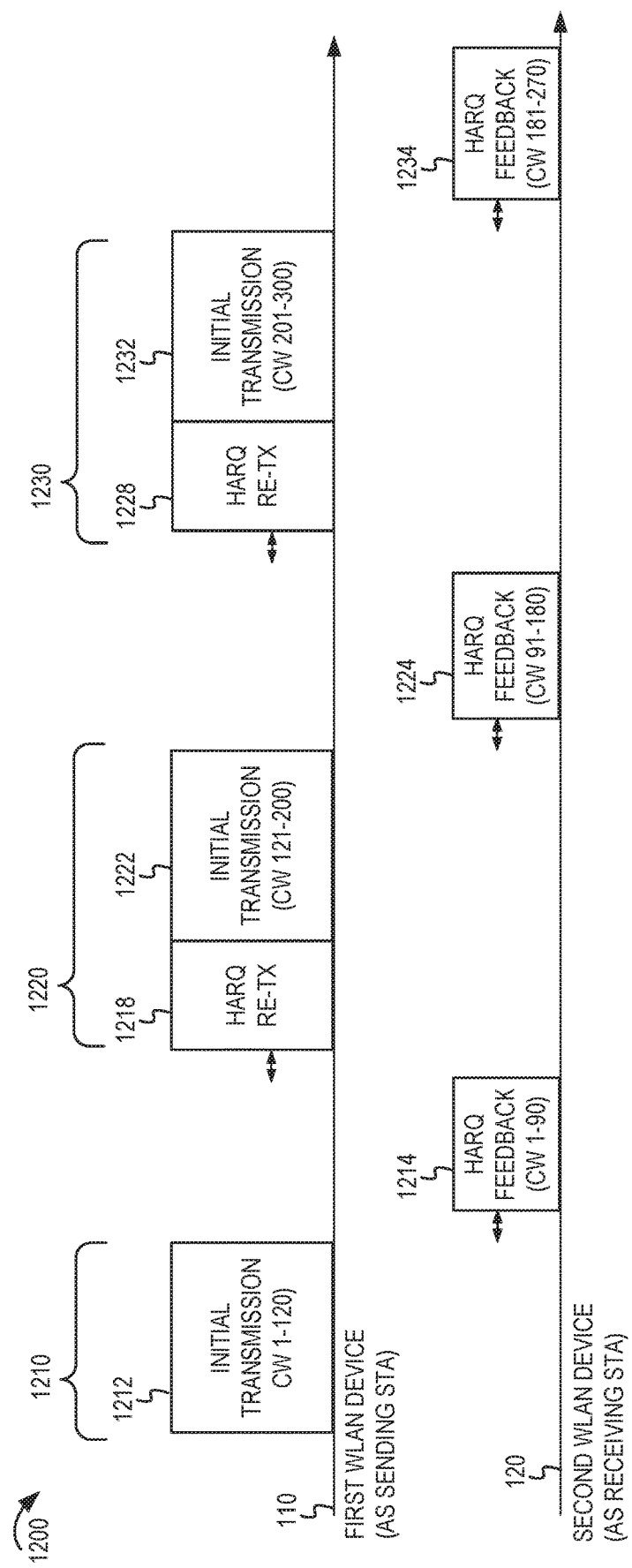
FIG. 12 depicts an example HARQ protocol that supports a sliding window feedback feature.

FIG. 12 depicts an example HARQ protocol 1200 that supports a sliding window feedback feature. The sliding window feedback uses aggregated HARQ retransmissions and HARQ initial transmissions in a same HARQ frame as described above. Additionally, the sliding window feedback may be based on a window size that is different from the HARQ transmission size.

The first WLAN device 110 may divide a source data (such as a PSDU or a stream of PSDUs) into groups of codewords. In the example of FIG. 12, each group may include a hundred (100) codewords. A first HARQ frame 1210 may include the HARQ initial transmission 1212 for codewords 1-100. Following the first HARQ frame 1210, the second WLAN device 120 may transmit a first HARQ feedback message 1214. The first HARQ feedback message 1214 may indicate the processing result for a portion of the codewords 1-100. For example, the first HARQ feedback message 1214 may include HARQ feedback for codewords 1-90. Note that the window for the HARQ feedback may be different (such as smaller) than the quantity of codewords included in the HARQ initial transmission 1212. This is to provide additional time for the second WLAN device 120 to process the last codewords in the HARQ initial transmission 1212—the feedback for which will be included in a subsequent HARQ feedback message.

In a second HARQ frame 1220, the first WLAN device 110 may transmit the HARQ retransmission 1218 for any failed codewords indicted in the first HARQ feedback message 1214 as well as the HARQ initial transmission 1222 for the next group of codewords 101-300. The second WLAN device 120 may transmit HARQ feedback for codewords 91-180, in a second HARQ feedback message 1224. Following the second HARQ feedback message 1224, the first WLAN device 110 may transmit a third HARQ frame 1230 that includes the HARQ retransmission 1228 for any failed codewords indicated in the second HARQ feedback message 1224, as well as the HARQ initial transmission 1232 for the next group of codewords 301-300.

The HARQ protocol 1200 shown in FIG. 12 makes use of aggregated HARQ retransmissions and HARQ initial transmissions and enables more time for the second WLAN device 120 to process the retransmitted codewords before providing feedback for them. For example, the codeword processing rate of the second WLAN device 120 may support processing the HARQ retransmission 1218 before the second HARQ feedback message 1224 when the HARQ initial transmission 1222 is included. The HARQ initial transmission 1222 may provide the additional time needed for the second WLAN device 120 to process the HARQ retransmission 1218.

Another feature of FIG. 12 is that the HARQ feedback that follows each HARQ initial transmission may use a sliding window that moves the feedback for some codewords to a later HARQ feedback message. This may be useful, for example, when the codeword processing rate of the second WLAN device 120 is slower than the codeword transmission rate but the second WLAN device 120 has enough memory to buffer the codewords.

Figure 13A:
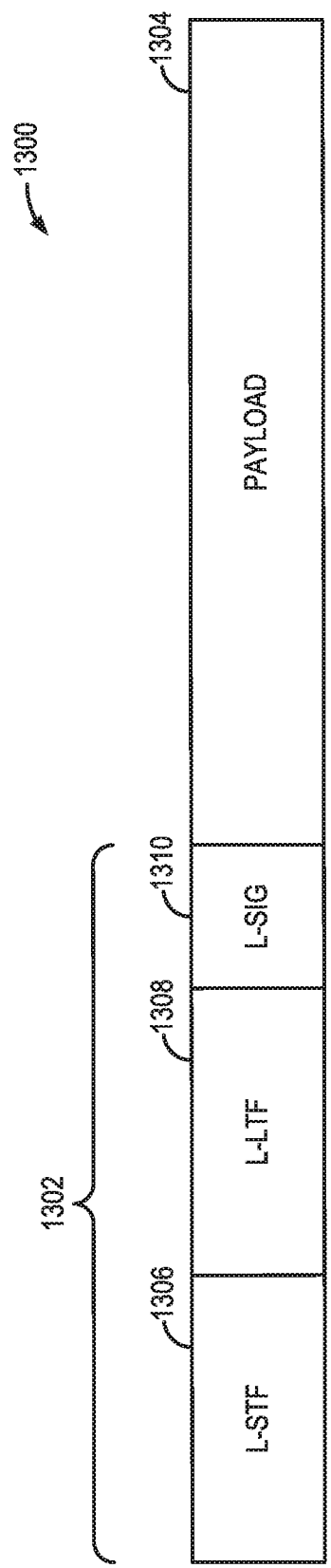
FIG. 13A shows an example protocol data unit (PDU) usable for communications between an access point (AP) and a station (STA).

FIG. 13A shows an example protocol data unit (PDU) 1300 usable for communications between an AP and a number of STAs. For example, the PDU 1300 can be configured as a PPDU. As shown, the PDU 1300 includes a PHY preamble 1302 and a PHY payload 1304. For example, the PHY preamble 1302 may include a legacy portion that itself includes a legacy short training field (L-STF) 1306, a legacy long training field (L-LTF) 1308, and a legacy signaling field (L-SIG) 1310. The PHY preamble 1302 also may include a non-legacy portion (not shown). The L-STF 1306 generally enables a receiving device to perform automatic gain control (AGC) and coarse timing and frequency estimation. The L-LTF 1308 generally enables a receiving device to perform fine timing and frequency estimation and also to estimate the wireless channel. The L-SIG 1310 generally enables a receiving device to determine a duration of the PDU and use the determined duration to avoid transmitting on top of the PDU. For example, the L-STF 1306, the L-LTF 1308 and the L-SIG 1310 may be modulated according to a binary phase shift keying (BPSK) modulation scheme. The payload 1304 may be modulated according to a BPSK modulation scheme, a quadrature BPSK (Q-BPSK) modulation scheme, a quadrature amplitude modulation (QAM) modulation scheme, or another appropriate modulation scheme. The payload 1304 may generally carry higher layer data, for example, in the form of medium access control (MAC) protocol data units (MPDUs) or an aggregated MPDU (A-MPDU).

Figure 13B:
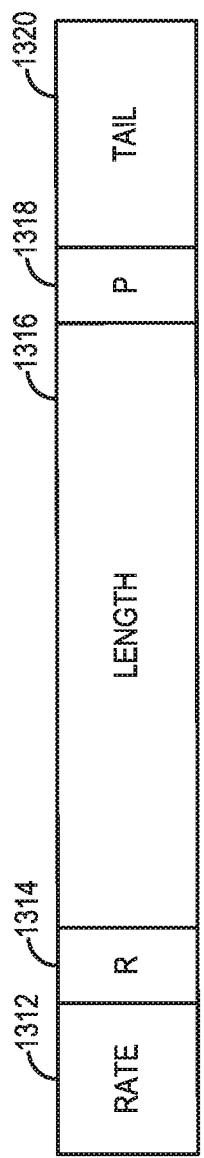
FIG. 13B shows an example field in the PDU of FIG. 13A.

FIG. 13B shows an example L-SIG field 1310 in the PDU of FIG. 13A. The L-SIG 1310 includes a data rate field 1312, a reserved bit 1314, a length field 1316, a parity bit 1318, and a tail field 1320. The data rate field 1312 indicates a data rate (note that the data rate indicated in the data rate field 1312 may not be the actual data rate of the data carried in the payload 1304). The length field 1316 indicates a length of the packet in units of, for example, bytes. The parity bit 1318 is used to detect bit errors. The tail field 1320 includes tail bits that are used by the receiving device to terminate operation of a decoder (for example, a Viterbi decoder). The receiving device utilizes the data rate and the length indicated in the data rate field 1312 and the length field 1316 to determine a duration of the packet in units of, for example, microseconds (μs).

Figure 14:
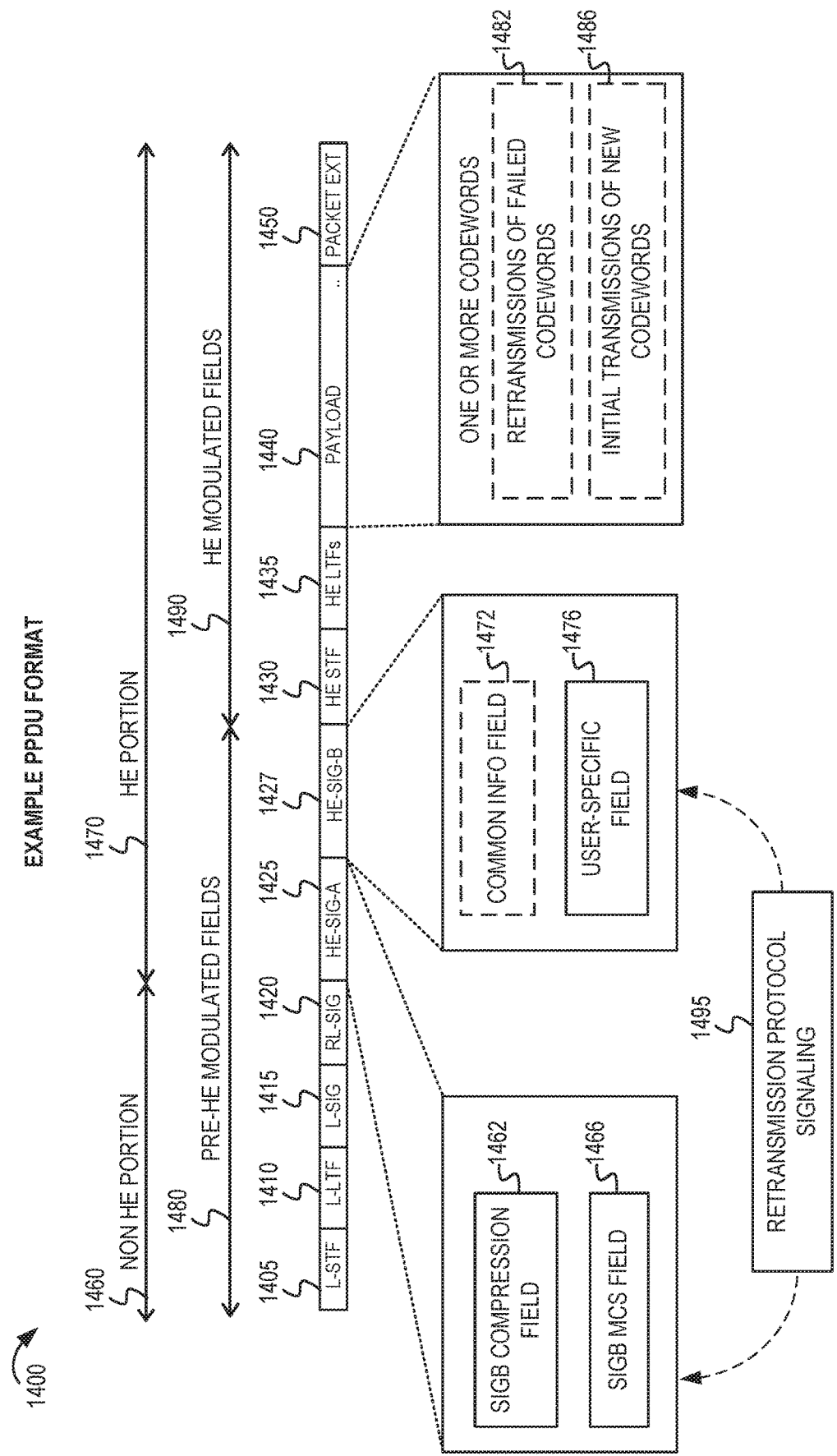
FIG. 14 depicts an example PPDU format for use with aspects of this disclosure.

FIG. 14 depicts an example PPDU format for use with aspects of this disclosure. The PPDU format 1400 may be used for a HARQ frame that includes interlaced communications. In some implementations, the example PPDU format 1400 may be based on a high-efficiency (HE) multi-user (MU) PPDU format defined in IEEE 802.11ax draft standard. Other example HARQ PPDU formats may be based on similar formats defined for IEEE 802.11be or beyond. Although the HE MU PPDU format is typically used to aggregate communications to multiple STAs, in some implementations the HE MU PPDU may be used to communicate with a single STA. In some implementations, the PPDU format 1400 may repurpose some fields of the HE MU PPDU format. The PPDU format 1400 may be modified to support the aspects of this disclosure. In some implementations, the PPDU format 1400 may be modified to support an aggregation of retransmissions with initial transmissions, both to a single WLAN device identified in a header of the PPDU format 1400. In some implementations, the PPDU format 1400 may be modified, extended, or redefined to support a retransmission protocol such as those described in this disclosure. For example, predetermined values may be defined for some fields of the HE MU PPDU format to cause a second WLAN device to identify a MU-PPDU as one of different types of HARQ PPDUs.

In addition to identifying the PPDU as a HARQ frame, it may be desirable for a second WLAN device to determine whether the HARQ frame is intended for it. For example, a header of the retransmission protocol PPDU may include a first identifier associated with the first WLAN device and a second identifier associated with the second WLAN device. Although identifiers of the first WLAN device and second WLAN device may be included in a header of an MPDU encapsulated within the payload 1440 of the PPDU format 1400, in some implementations, the first WLAN device may use an unencoded portion of the PPDU header to identify the second WLAN device or the first WLAN device.

Turning to the example PPDU format 1400, each field and portion will be briefly described. A non-HE portion 1460 includes a legacy short training field 1405 (L-STF), a legacy long training field 1410 (L-LTF), and a legacy signal field 1415 (L-SIG). The remaining portion of the PPDU is considered an HE modulated portion 1470 because it includes features that are relevant to devices capable of HE transmissions. The pre-HE modulated fields 1480 include the non-HE portion 1460 as well as some fields to bootstrap the HE modulated fields 1490. For example, the pre-HE modulated fields 1480 may further include a repeated legacy signal field 1420 (RL-SIG), a first HE signal field 1425 (HE-SIG-A), and a second HE signal field 1427 (HE-SIG-B). The repeated legacy signal field 1420 and the first HE signal field 1425 may be modulated using a more reliable (robust) modulation that has lower throughput than the modulation scheme using for the HE modulated fields 1490.

The HE modulated fields 1490 includes an HE short training field 1430 (HE STF), one or more symbols for an HE long training field 1435 (HE LTF), a payload 1440, and may include a packet extension field 1450. The HE modulated fields 1490 is modulated using inverse fast Fourier transform (IFFT) to convert the signal to orthogonal carrier transmissions in the time domain. The payload 1440 may include FEC-encoded codewords. For example, the payload 1440 may include retransmissions of failed codewords 1482 and initial transmissions of new codewords 1486.

The HE-SIG-A may include fields such as a SIGB Compression field 1462 and a SIGB MCS field 1466. There may be other fields (not shown) in the HE-SIG-A. A value of "1" in the SIGB Compression field 1462 may be used to indicate a short format for the HE-SIG-B field, such as when the HARQ PPDU is being sent to a single user. When the SIGB Compression field 1462 indicates "1," a common information field 1472 may be eliminated from the HE-SIG-B field to reduce overhead. The HE-SIG-B field may include one or more user-specific fields 1476. In the example where the HARQ PPDU is being sent to a single user, there may be only one user-specific field 1476.

In some implementations, the PPDU format 1400 may include retransmission protocol signaling 1495 in the PHY header, such as in the HE-SIG-A, the HE-SIG-B, or both. For example, to help the second WLAN device identify the PPDU as a HARQ PPDU, the PHY header may include retransmission protocol indicator. The retransmission protocol indicator may be included in the HE-SIG-A or the HE-SIG-B, or both. Furthermore, there may be different ways to include a retransmission protocol indicator. In some implementations, the retransmission protocol indicator may be represented by a combination of predetermined values in the fields of a HE MU PPDU format. Another alternative for the retransmission protocol indicator may use a reserved bit in the user-specific field 1476. There may be other ways to represent the retransmission protocol indicator in the PPDU.

Other retransmission protocol signaling 1495 may be included in the PPDU format 1400. For example, signaling in the PHY header may be used to indicate the format, coding rate, bit rate, puncturing rate, modulation order, or other information about the HARQ frame.

Figure 15:
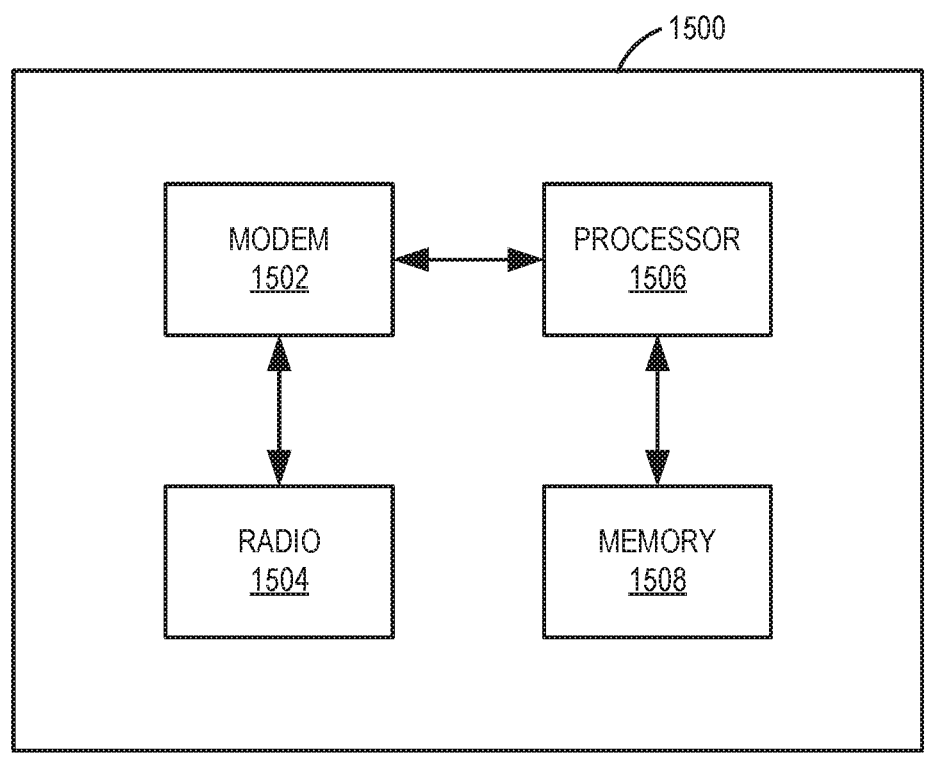
FIG. 15 shows a block diagram of an example wireless communication device.

FIG. 15 shows a block diagram of an example wireless communication device 1500. In some implementations, the wireless communication device 1500 can be an example of a device for use in a STA such as one of the STAs 104, 144 described herein. In some implementations, the wireless communication device 1500 can be an example of a device for use in an AP such as the AP 102 described herein. The wireless communication device 1500 is capable of transmitting (or outputting for transmission) and receiving wireless communications (for example, in the form of wireless packets). For example, the wireless communication device 1500 can be configured to transmit and receive packets in the form of physical layer convergence protocol (PLCP) protocol data units (PPDUs) and Media Access Control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 1500 can be, or can include, a chip, system on chip (SoC), chipset, package or device that includes one or more modems 1502, for example, a Wi-Fi (IEEE 802.11 compliant) modem. In some implementations, the one or more modems 1502 (collectively "the modem 1502") additionally include a WWAN modem (for example, a 3GPP 4G LTE or 5G compliant modem). In some implementations, the wireless communication device 1500 also includes one or more radios 1504 (collectively "the radio 1504"). In some implementations, the wireless communication device 1500 further includes one or more processors, processing blocks or processing elements (collectively "the processor 1506") and one or more memory blocks or elements (collectively "the memory 1508").

The modem 1502 can include an intelligent hardware block or device such as, for example, an application-specific integrated circuit (ASIC) among other possibilities. The modem 1502 is generally configured to implement a PHY layer. For example, the modem 1502 is configured to modulate packets and to output the modulated packets to the radio 1504 for transmission over the wireless medium. The modem 1502 is similarly configured to obtain modulated packets received by the radio 1504 and to demodulate the packets to provide demodulated packets. In addition to a modulator and a demodulator, the modem 1502 may further include digital signal processing (DSP) circuitry, automatic gain control (AGC), a coder, a decoder, a multiplexer and a demultiplexer. For example, while in a transmission mode, data obtained from the processor 1506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 1504. In implementations involving beamforming, the modulated symbols in the respective spatial streams are precoded via a steering matrix prior to their provision to the IFFT block.

While in a reception mode, digital signals received from the radio 1504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 1506) for processing, evaluation or interpretation.

The radio 1504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 1500 can include, or be coupled with, multiple transmit antennas (each with a corresponding transmit chain) and multiple receive antennas (each with a corresponding receive chain). The symbols output from the modem 1502 are provided to the radio 1504, which then transmits the symbols via the coupled antennas. Similarly, symbols received via the antennas are obtained by the radio 1504, which then provides the symbols to the modem 1502.

The processor 1506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1506 processes information received through the radio 1504 and the modem 1502, and processes information to be output through the modem 1502 and the radio 1504 for transmission through the wireless medium. For example, the processor 1506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 1506 may generally control the modem 1502 to cause the modem to perform various operations described above.

The memory 1508 can include tangible storage media such as random-access memory (RAM) or read-only memory (ROM), or combinations thereof. The memory 1508 also can store non-transitory processor- or computer-executable software (SW) code containing instructions that, when executed by the processor 1506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the wireless communication device 1500 may include a HARQ protocol unit (not shown). The HARQ protocol unit may be similar to the HARQ protocol unit 112 or the HARQ protocol unit 122 described with reference to FIG. 2 and may implement any of the HARQ techniques described herein. In some implementations, the HARQ protocol unit may be implemented by a processor 1506 and a memory 1508. The memory 1508 can include computer instructions executable by the processor 1506 to implement the functionality of the HARQ protocol unit. Any of these functionalities may be partially (or entirely) implemented in hardware or on the processor 1506.

In some implementations, the wireless communication device 1500 may include a HARQ transmission unit (not shown), a HARQ reception unit (not shown), a HARQ feedback unit (not shown), or any combination thereof, similar to the HARQ transmission unit 114, the HARQ reception unit 123, and the HARQ feedback unit 124, respectively, as described with reference to FIG. 2. The HARQ transmission unit, the HARQ reception unit, or the HARQ feedback unit may implement any of the HARQ techniques described herein. In some implementations, the HARQ transmission unit, the HARQ reception unit, or the HARQ feedback unit may be implemented by a processor 1506 and a memory 1508. The memory 1508 can include computer instructions executable by the processor 1506 to implement the functionality of the HARQ transmission unit, the HARQ reception unit, or the HARQ feedback unit. Any of these functionalities may be partially (or entirely) implemented in hardware or on the processor 1506.

Figure 16B:
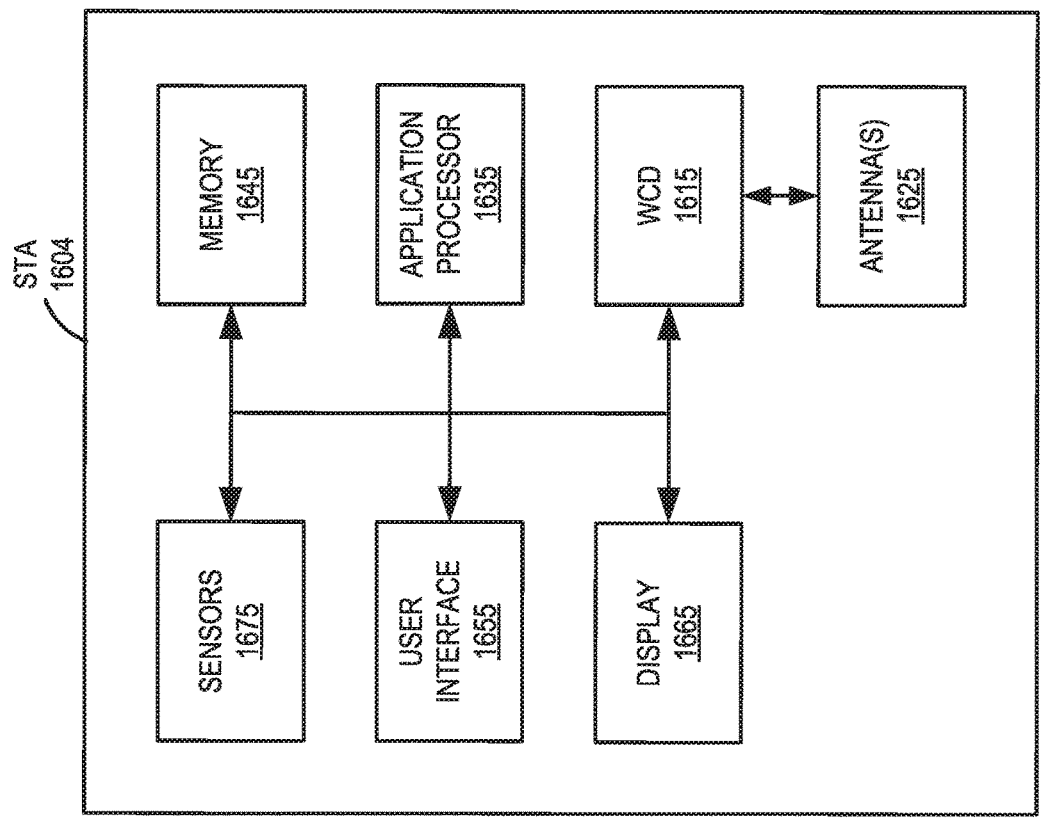
FIG. 16B shows a block diagram of an example STA.
Figure 16A:
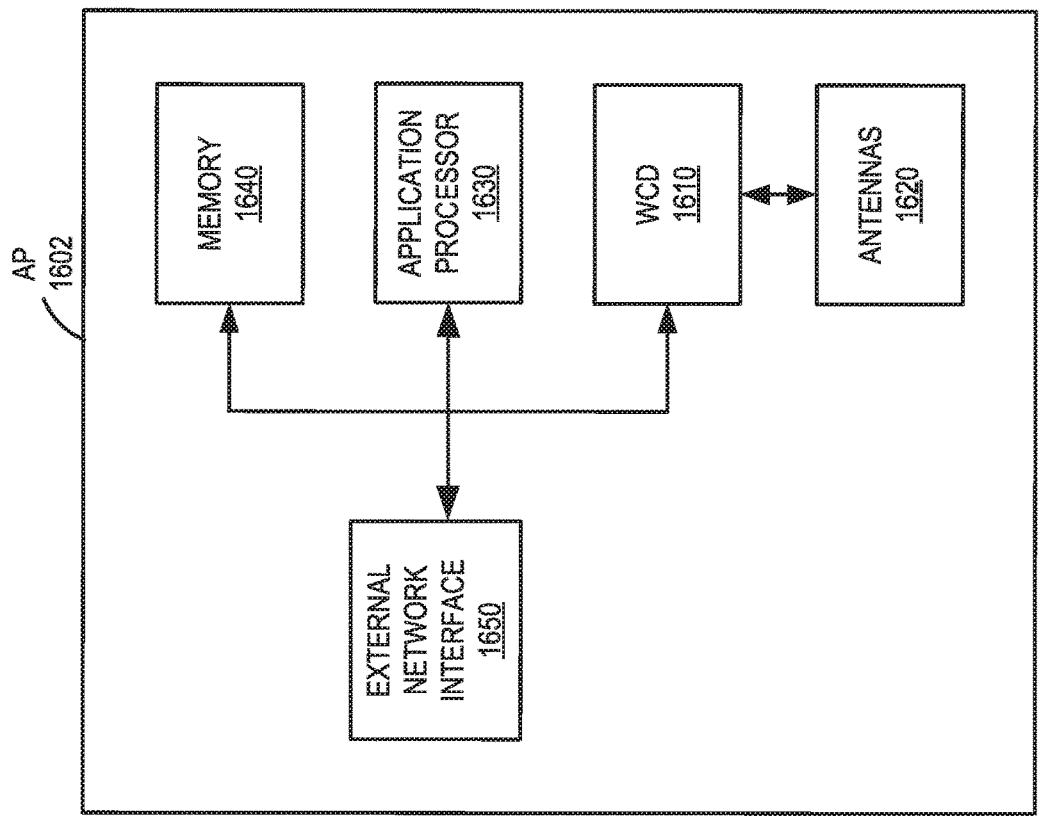
FIG. 16A shows a block diagram of an example AP.

FIG. 16A shows a block diagram of an example AP 1602. For example, the AP 1602 can be an example implementation of the AP 102 described herein. The AP 1602 includes a wireless communication device (WCD) 1610. For example, the wireless communication device 1610 may be an example implementation of the wireless communication device 1500 described with reference to FIG. 15. The AP 1602 also includes multiple antennas 1620 coupled with the wireless communication device 1610 to transmit and receive wireless communications. In some implementations, the AP 1602 additionally includes an application processor 1630 coupled with the wireless communication device 1610, and a memory 1640 coupled with the application processor 1630. The AP 1602 further includes at least one external network interface 1650 that enables the AP 1602 to communicate with a core network or backhaul network to gain access to external networks including the Internet. For example, the external network interface 1650 may include one or both of a wired (for example, Ethernet) network interface and a wireless network interface (such as a WWAN interface). Ones of the aforementioned components can communicate with other ones of the components directly or indirectly, over at least one bus. The AP 1602 further includes a housing that encompasses the wireless communication device 1610, the application processor 1630, the memory 1640, and at least portions of the antennas 1620 and external network interface 1650.

FIG. 16B shows a block diagram of an example STA 1604. For example, the STA 1604 can be an example implementation of the STA 104, 144 described herein. The STA 1604 includes a wireless communication device 1615. For example, the wireless communication device 1615 may be an example implementation of the wireless communication device 1500 described with reference to FIG. 15. The STA 1604 also includes one or more antennas 1625 coupled with the wireless communication device 1615 to transmit and receive wireless communications. The STA 1604 additionally includes an application processor 1635 coupled with the wireless communication device 1615, and a memory 1645 coupled with the application processor 1635. In some implementations, the STA 1604 further includes a user interface (UI) 1655 (such as a touchscreen or keypad) and a display 1665, which may be integrated with the UI 1655 to form a touchscreen display. In some implementations, the STA 1604 may further include one or more sensors 1675 such as, for example, one or more inertial sensors, accelerometers, temperature sensors, pressure sensors, or altitude sensors. Ones of the aforementioned components can communicate with other ones of the components directly or indirectly, over at least one bus. The STA 1604 further includes a housing that encompasses the wireless communication device 1615, the application processor 1635, the memory 1645, and at least portions of the antennas 1625, UI 1655, and display 1665.

Figure 17A:
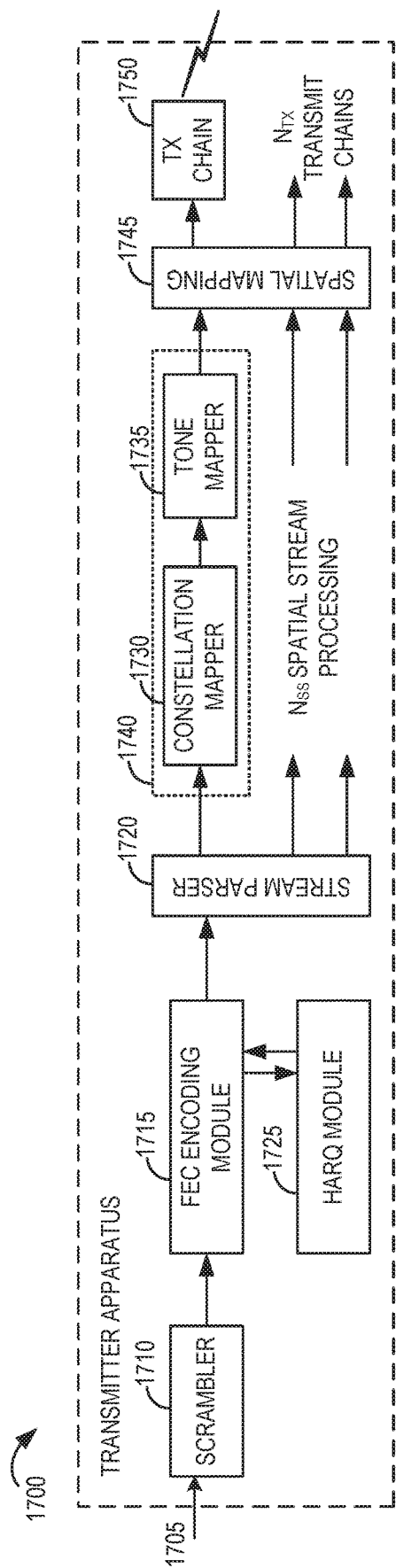
FIG. 17A depicts a block diagram of an example transmitter apparatus for a first WLAN device that supports an example retransmission protocol using incremental redundancy.

FIG. 17A depicts a block diagram of an example transmitter apparatus for a first WLAN device that supports an example retransmission protocol using incremental redundancy. The example transmitter apparatus 1700 shows some of the functional blocks in a first WLAN device (such as the first WLAN device 110 described herein). The example transmitter apparatus 1700 is one of many designs for a transmitter. In this Figure, the example transmitter apparatus 1700 is designed for LDPC encoding. In the design described in FIG. 17A, source data 1705 may be processed by a scrambler 1710 and an FEC encoding module 1715. The scrambler 1710 may scramble the source data 1705 to reduce the probability of long sequences of zeros or ones. The FEC encoding module 1715 may perform encoding for error correction and error detection. For example, the FEC encoding module 1715 may perform FEC and add redundancy or CRC bits to the source data. A HARQ module 1725 may maintain a mapping between the scrambled source data and the output of the FEC encoding module 1715. Furthermore, the HARQ module 1725 may store the codeword, punctured parity bits, or other information generated by the FEC encoding module 1715.

In accordance with this disclosure, the HARQ module 1725 may be configured to interlace communication after a HARQ retransmission. The HARQ module 1725 may prepare the HARQ retransmission and determine the amount of time following the HARQ retransmission that can be used for an interlaced communication. Furthermore, the HARQ module 1725 may add the retransmission protocol signaling to the HARQ PPDU to inform the second WLAN device 120 regarding the features implemented according to aspects of this disclosure.

The encoded data may be sent to a stream parser 1720 that divides the encoded data into $N_{SS}$ spatial streams. In some implementations, there may be only one spatial stream and the stream parser 1720 may be unused. An example of spatial stream processing 1740 may include a constellation mapper 1730 and a tone mapper 1735. The constellation mapper 1730 maps the sequence of bits in each spatial stream to constellation points (complex numbers). The constellation mapper 1730 may perform the modulation of the bits based on an MCS that defines the constellation points. The tone mapper 1735 may translate the output from the constellation mapper 1730 to the frequencies used for the transmission.

After the spatial streams are processed, a spatial mapping 1745 may map space-time streams to $N_{TX}$ transmit chains (including TX chain 1750). There may be different ways of mapping the streams to transmit chains. For example, in a direct mapping the constellation points from each space-time stream may be mapped directly onto the transmit chains (one-to-one mapping). Another example may use spatial expansion, in which vectors of constellation points from all the space-time streams are expanded via matrix multiplication to produce the input to all of the transmit chains. The spatial mapping 1745 may support beamforming (like spatial expansion), in which each vector of constellation points from all of the space-time streams is multiplied by a matrix of steering vectors to produce the input to the transmit chains.

Each TX chain 1750 may prepare a plurality of OFDM symbols based on the constellation points. For example, the TX chain 1750 may include an inverse discrete Fourier transform (IDFT) that converts a block of constellation points to a time domain block. The TX chain 1750 may include a cyclic shift (CSD), guard interval inserter, and an analog front end to transmit OFDM symbols as radio frequency (RF) energy.

The transmitter apparatus 1700 described in FIG. 17A is only one example of a transmitter apparatus. Other block diagrams may add or remove functional blocks.

Figure 17B:
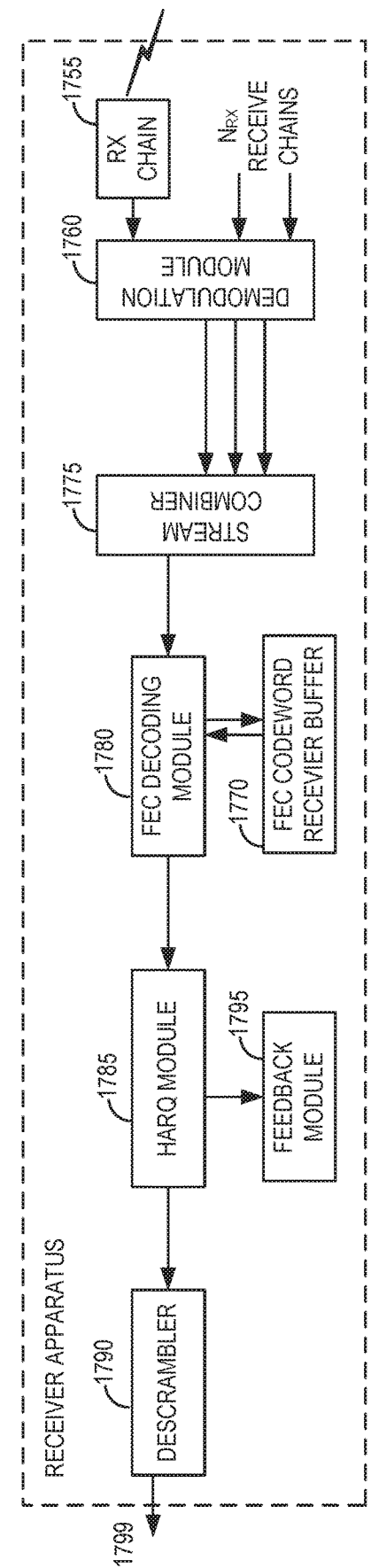
FIG. 17B depicts a block diagram of an example receiver apparatus for a second WLAN device that supports an example retransmission protocol using incremental redundancy.

FIG. 17B depicts a block diagram of an example receiver apparatus for a second WLAN device that supports an example retransmission protocol using incremental redundancy. The example receiver apparatus 1701 shows some of the functional blocks in a receiving STA (such as the second WLAN device 120 described herein). The example receiver apparatus 1701 is one of many possible designs for a receiver. In the example of FIG. 17B, RF energy may be received by an analog front end of a receive (RX) chain 1755. For example, the RX chain 1755 may include an antenna and automatic gain control (AGC) components (not shown). Furthermore, the RX chain 1755 may include a fast Fourier transform (FFT) function to convert time domain symbols to a frequency domain representation of received data. $N_{RX}$ receive chains may prepare frequency domain representations of received data associated with each RX chain. Each spatial stream may be processed by a demodulation module 1760. The demodulation module 1760 may convert the frequency domain representations into a plurality of spatial streams. As a result, the demodulation module 1760 may provide $N_{SS}$ spatial streams. A stream combiner 1775 may reverse the process of the stream parser 1720 of the transmitter. For example, the stream combiner 1775 may combine bitstreams from multiple spatial streams to prepare encoded data bits for a decoding module 1780. The decoding module 1780 may decode the encoded bits. In some implementations, the decoding module 1780 may implement error correction using redundancy bits in the encoded bits. An FEC codeword receiver buffer 1770 may store a previous FEC codeword for subsequent use if the decoding module 1780 does not successfully decode the codeword. After receiving additional parity bits, the decoding module 1780 may obtain the stored FEC codeword from the FEC codeword receiver buffer 1770 and reattempt to decode it using the additional parity bits. A HARQ module 1785 may coordinate with the decoding module 1780 to implement the retransmission protocol. For example, the HARQ module 1785 may configure the decoding module 1780 for use with additional parity bits and may negotiate the retransmission protocol parameters with the first WLAN device. A feedback module 1795 may prepare a feedback message based on the retransmission protocol. A descrambler 1790 may reverse the scrambling performed by the scrambler 1710 and provide the data 1799 to an upper layer of the second WLAN device.

The HARQ module 1785 may implement some of the timing aspects described in this disclosure. For example, the HARQ module 1785 may cause the receiver apparatus 1701 to send the HARQ feedback using the sliding window feedback feature, the bitmap, a truncated bitmap, or any combination thereof. In some implementations, the HARQ module 1785 may be configured to generate a PHY preamble ack according to the HARQ retransmission protocol while the HARQ module 1785 processes the received codewords.

Figure 18A:
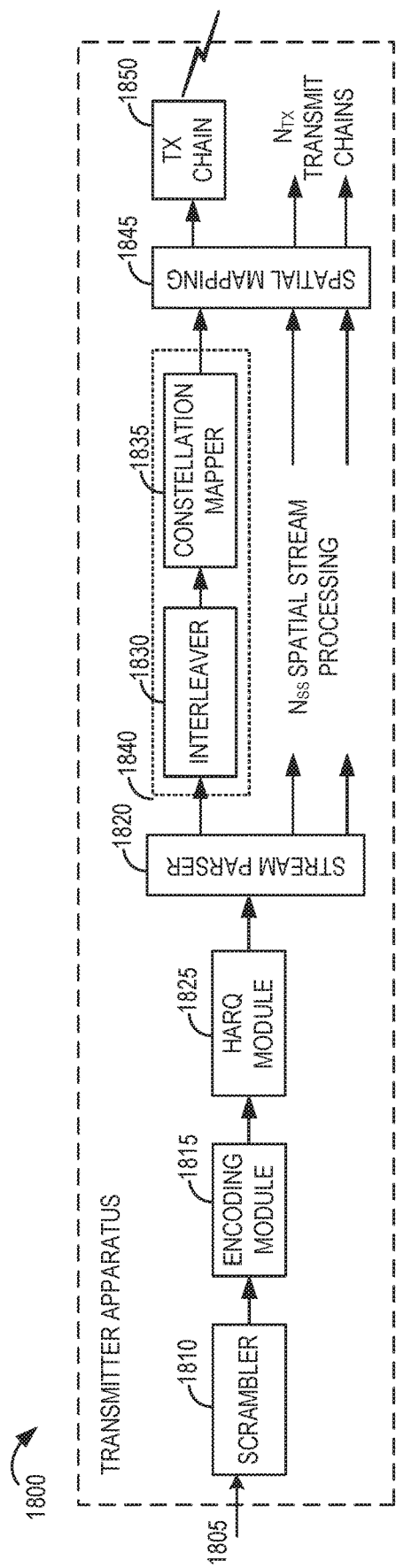
FIG. 18A depicts a block diagram of another example transmitter apparatus for a first WLAN device that supports an example retransmission protocol using punctured Chase combining.

FIG. 18A depicts a block diagram of another example transmitter apparatus for a first WLAN device that supports an example retransmission protocol using punctured Chase combining. The example transmitter apparatus 1800 shows some of the functional blocks in a first WLAN device (such as the first WLAN device 110 described herein). The example transmitter apparatus 1800 is one or may designs for a transmitter. In this Figure, the example transmitter apparatus 1800 is designed for BCC encoding. In the design described in FIG. 18A, source data 1805 may be processed by a scrambler 1810 and an encoding module 1815. The scrambler 1810 may scramble the source data 1805 to reduce the probability of long sequences of zeros or ones. The scrambler 1810 may use a seed to determine the scrambled bits. In some implementations, a first WLAN device may indicate a scrambling seed or state in a message (such as a HARQ initial transmission) to the second WLAN device. In some implementations, the retransmitted data in a HARQ retransmission may use the same scrambling as the original data in a first HARQ transmission. Using the same scrambling may enable the second WLAN device to combine the HARQ transmissions before performing descrambling.

The encoding module 1815 may perform encoding for error correction and error detection. For example, the encoding module 1815 may perform FEC and add redundancy or CRC bits to the source data. The encoder may use BCC to encode the data. The encoded data may be sent to a stream parser 1820 that divides the encoded data into $N_{SS}$ spatial streams. In some implementations, there may only be one spatial stream and the stream parser 1820 may be unused. An example of spatial stream processing 1840 may include a HARQ module 1825, an interleaver 1830, and a constellation mapper 1835. The HARQ module 1825 may buffer encoded bits for the spatial stream so that they can be used, if necessary, for a HARQ retransmission. Although show before the stream parser 1820, in some implementations the HARQ module 1825 may be positioned after the stream parser 1820 or after the interleaver 1830. Alternatively, there may be multiple HARQ modules in the transmitter apparatus 1800 to support different options for HARQ retransmission. The interleaver 1830 interleaves the bits of each spatial stream (changes order of bits) to prevent long sequences of adjacent noisy bits from entering the BCC decoder. The interleaver 1830 may be present in transmitter designs that use BCC encoding. When LDPC encoding is used (rather than BCC), the interleaver 1830 may be omitted. Interleaving is applied only when BCC encoding is used. The constellation mapper 1835 maps the sequence of bits in each spatial stream to constellation points (complex numbers). The constellation mapper 1835 may perform the modulation of the bits based on an MCS that defines the constellation points.

After the spatial streams are processed, a spatial mapping 1845 may map space-time streams to $N_{TX}$ transmit chains (including TX chain 1850). There may be different ways of mapping the streams to transmit chains. For example, in a direct mapping the constellation points from each space-time stream may be mapped directly onto the transmit chains (one-to-one mapping). Another example may use spatial expansion, in which vectors of constellation points from all the space-time streams are expanded via matrix multiplication to produce the input to all of the transmit chains. The spatial mapping 1845 may support beamforming (like spatial expansion), in which each vector of constellation points from all of the space-time streams is multiplied by a matrix of steering vectors to produce the input to the transmit chains.

Each TX chain 1850 may prepare a plurality of OFDM symbols based on the constellation points. For example, the TX chain 1850 may include an inverse discrete Fourier transform (IDFT) that converts a block of constellation points to a time domain block. The TX chain 1850 may include a cyclic shift (CSD), guard interval inserter, and an analog front end to transmit OFDM symbols as radio frequency (RF) energy.

The transmitter apparatus 1800 described in FIG. 18A is only one example of a transmitter apparatus. Other block diagrams may add or remove functional blocks.

In FIG. 18A, the example transmitter apparatus 1800 may support BCC or LDPC encoding. When using partial retransmission (such as punctured Chase combining or incremental redundancy), the retransmitted coded bits (in the HARQ retransmission) generated from same source data may not be in the "same" stream as the original coded bits in the HARQ initial transmission. In the example of FIG. 18A, the HARQ module 1825 may be used to perform HARQ encoding or retransmission before the stream parser 1820. Doing so may enable the transmitter apparatus to use different quantities of spatial streams for the HARQ retransmission than were used in the HARQ initial transmission.

Figure 18B:
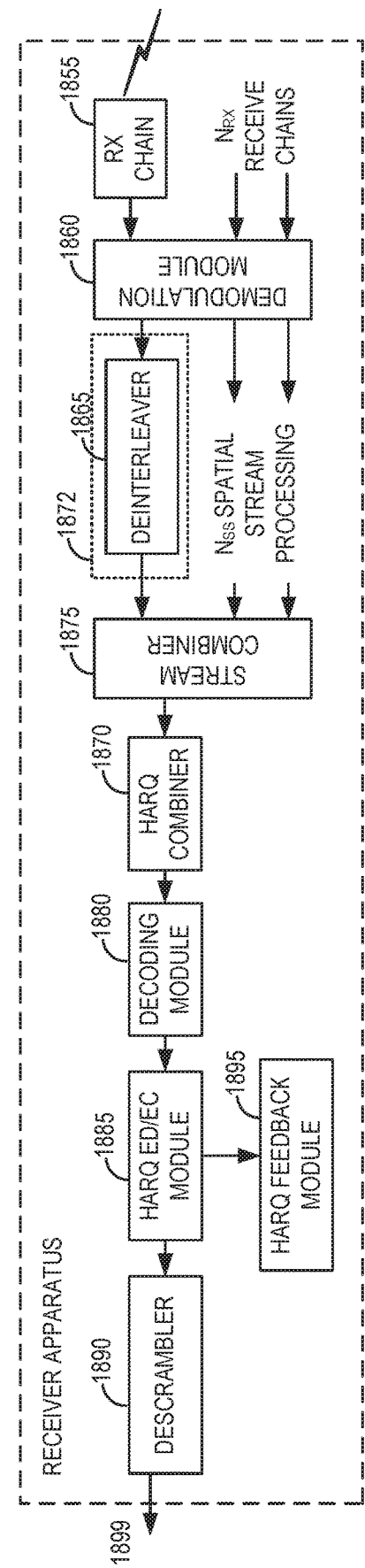
FIG. 18B depicts a block diagram of another example receiver apparatus for a second WLAN device that supports the example retransmission protocol using punctured Chase combining.

FIG. 18B depicts a block diagram of another example receiver apparatus for a second WLAN device that supports the example retransmission protocol using punctured Chase combining. The example receiver apparatus 1801 shows some of the functional blocks in a second WLAN device (such as the second WLAN device 120 described herein. The example receiver apparatus 1801 is one of many possible designs for a receiver. In the example of FIG. 18B, RF energy may be received by an analog front end of a receive (RX) chain 1855. For example, the RX chain 1855 may include an antenna and automatic gain control (AGC) components (not shown). Furthermore, the RX chain 1855 may include a fast Fourier transform (FFT) function to convert time domain symbols to a frequency domain representation of received data. $N_{RX}$ receive chains may prepare frequency domain representations of received data associated with each RX chain. Each spatial stream may be processed by a demodulation module 1860. The demodulation module 1860 may convert the frequency domain representations into a plurality of spatial streams. As a result, the demodulation module 1860 may provide $N_{SS}$ spatial streams. An example of spatial stream processing 1872 may include a deinterleaver 1865 and a HARQ combiner 1872. If BCC interleaver was used in the transmitter apparatus 1800, the deinterleaver 1865 may perform a de-interleaving of the bitstream to recover an original ordering of the bitstream. A stream combiner 1875 may reverse the process of the stream parser 1820 of the transmitter. For example, the stream combiner 1875 may combine bitstreams from multiple spatial streams to prepare encoded data bits to send to the HARQ module 1870. The HARQ module 1870 may be used to perform HARQ processing after the stream combiner 1875. FIG. 18B supports a HARQ process that corresponds to the transmitter apparatus described in FIG. 18A. In some implementations, the HARQ module 1870 may be located between the deinterleaver 1865 and the stream combiner 1875. The HARQ combiner 1870 combines a HARQ retransmission with a HARQ initial transmission having the same codewords. The HARQ combiner 1870 may use LLR calculations to recover a bit stream. The HARQ module 1870 may send the recovered bit stream to the decoding module 1880.

The decoding module 1880 may decode the encoded bits. In some implementations, the decoding module 1880 may implement error correction using redundancy bits in the encoded bits. A HARQ error detection and error correction module 1885 may use a HARQ process in coordination with the decoding module 1880. For example, the HARQ error detection and error correction module 1885 may attempt to correct errors in the decoded bits. A HARQ feedback module 1895 may prepare a feedback message based on the HARQ protocol. A descrambler 1890 may reverse the scrambling performed by the scrambler 1810 and provide the data 1899 to an upper layer of the second WLAN device.

Figure 19:
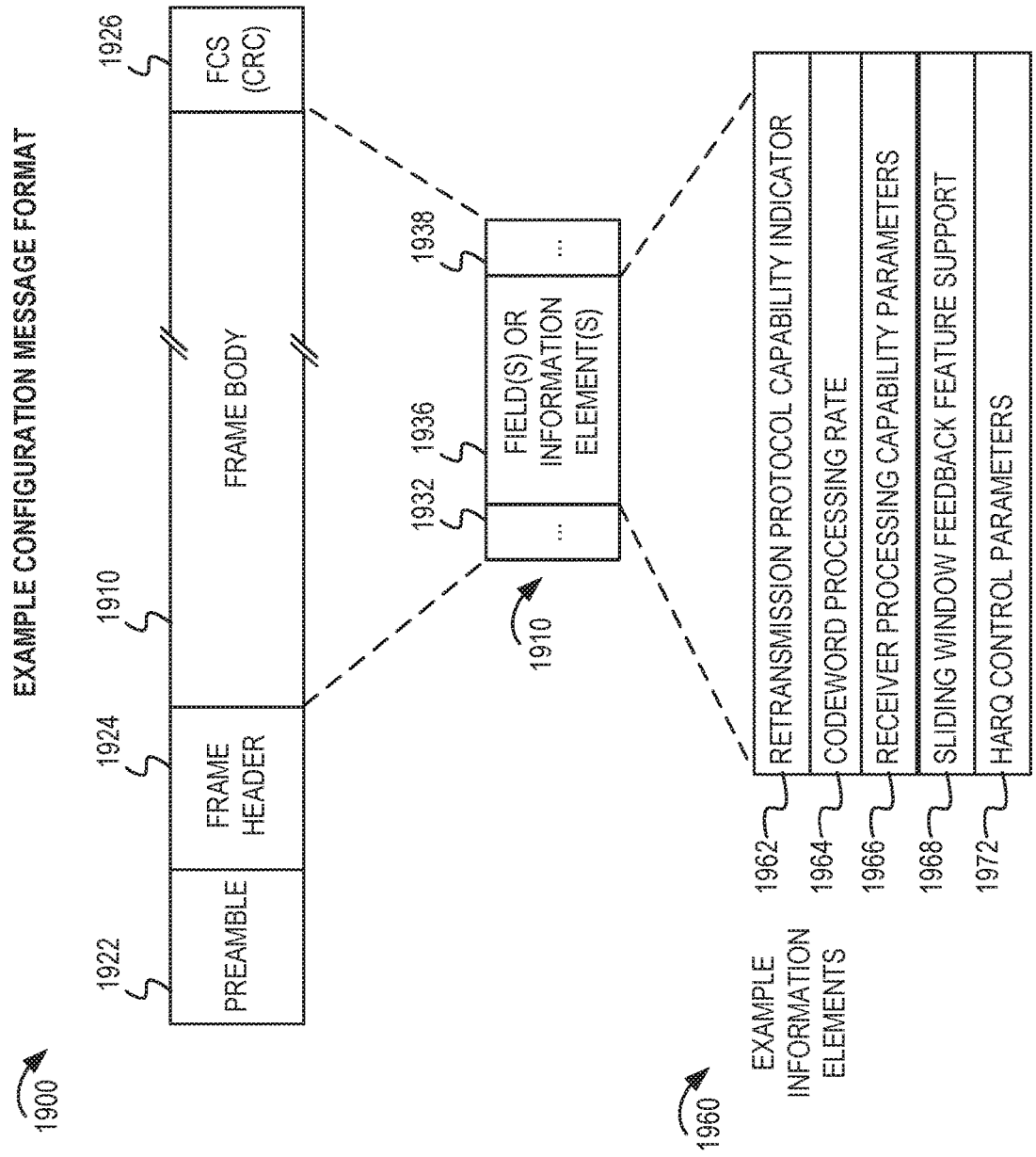
FIG. 19 depicts a conceptual diagram of an example configuration message for use with aspects of this disclosure.

FIG. 19 depicts a conceptual diagram of an example configuration message for use with aspects of this disclosure. For example, the example message 1900 may be sent from a first WLAN device to a second WLAN device, or vice versa. The example message 1900 may include a preamble 1922, a header 1924, a payload 1910, and a frame check sequence (FCS) 1926. The preamble 1922 may include one or more bits to establish synchronization. The preamble 1922 may be used, for example, when a dedicated discovery channel uses a listen-before-talk, contention-based access, or carrier sense access. In some implementations, if the dedicated discovery channel uses a scheduled timeslot for transmission, the preamble 1922 may be omitted. The header 1924 may include source and destination network addresses (such as the network address of the sending AP and receiving AP, respectively), the length of data frame, or other frame control information. In some implementations, the header 1924 also may indicate a technology type associated with a technology-specific payload (if the payload 1910 is specific to a particular technology type or types). The payload 1910 may be used to convey the retransmission protocol parameters. The retransmission protocol parameters may be organized or formatted in a variety of ways. The payload 1910 may be organized with a message format and may include information elements 1932, 1936, and 1538. Several examples of information elements are illustrated in FIG. 19.

Example information elements 1960 may be sent as part of a retransmission protocol configuration or setup message. In some implementations, the example information elements 1960 may include initial (default) parameters for a retransmission protocol. In some implementations, the example information elements 1960 may include a retransmission protocol capability indicator 1962 to indicate that the WLAN device supports the retransmission protocol features in this disclosure. The example information elements 1960 may include a codeword processing rate 1964, one or more other receiver processing capability parameters 1966, a sliding window feedback feature support indicator 1968, HARQ control parameters 1972, or any combination thereof. The codeword processing rate 1964 and one or more other receiver processing capability parameters 1966 may inform the first WLAN device (as transmitter) about the processing capabilities of the second WLAN device (as receiver). The sliding window feedback feature support indicator 1968 may be a version number or an explicit indicator that indicates that a WLAN device supports the sliding window feedback features of this disclosure. The HARQ control parameters 1972 may include parameters to adjust the HARQ process based on channel conditions, receiver processing capability, receiver processing status, among other examples.

Figure 20:
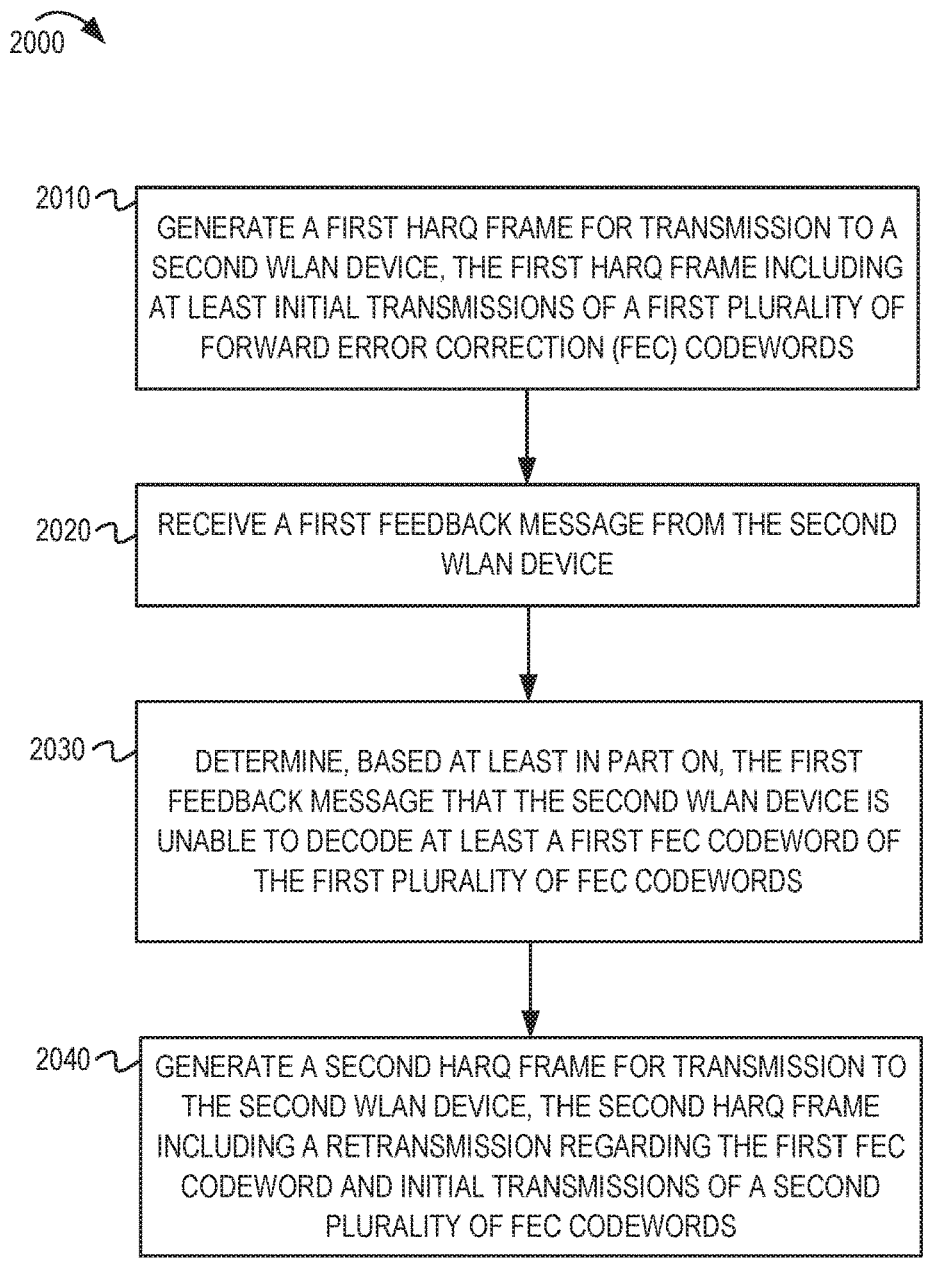
FIG. 20 depicts a flowchart with an example process for a WLAN device that communicates HARQ transmissions according to aspects of this disclosure.

FIG. 20 depicts a flowchart with an example process 2000 for a WLAN device that communicates HARQ transmissions according to aspects of this disclosure. The example process 2000 may be performed by a first WLAN device (such as the first WLAN device 110 acting as the sending STA). At block 2010, the first WLAN device may generate a first HARQ frame for transmission to a second WLAN device. The first HARQ frame may include at least initial transmissions of a first plurality of forward error correction (FEC) codewords. At block 2020, the first WLAN device may receive a first feedback message from the second WLAN device. At block 2030, the first WLAN device may determine, based on the first feedback message, that the second WLAN device is unable to decode at least a first FEC codeword of the first plurality of FEC codewords. At block 2040, the first WLAN device may generate a second HARQ frame for transmission to the second WLAN device. The second HARQ frame may include a retransmission regarding the first FEC codeword and initial transmissions of a second plurality of FEC codewords.

Figure 21:
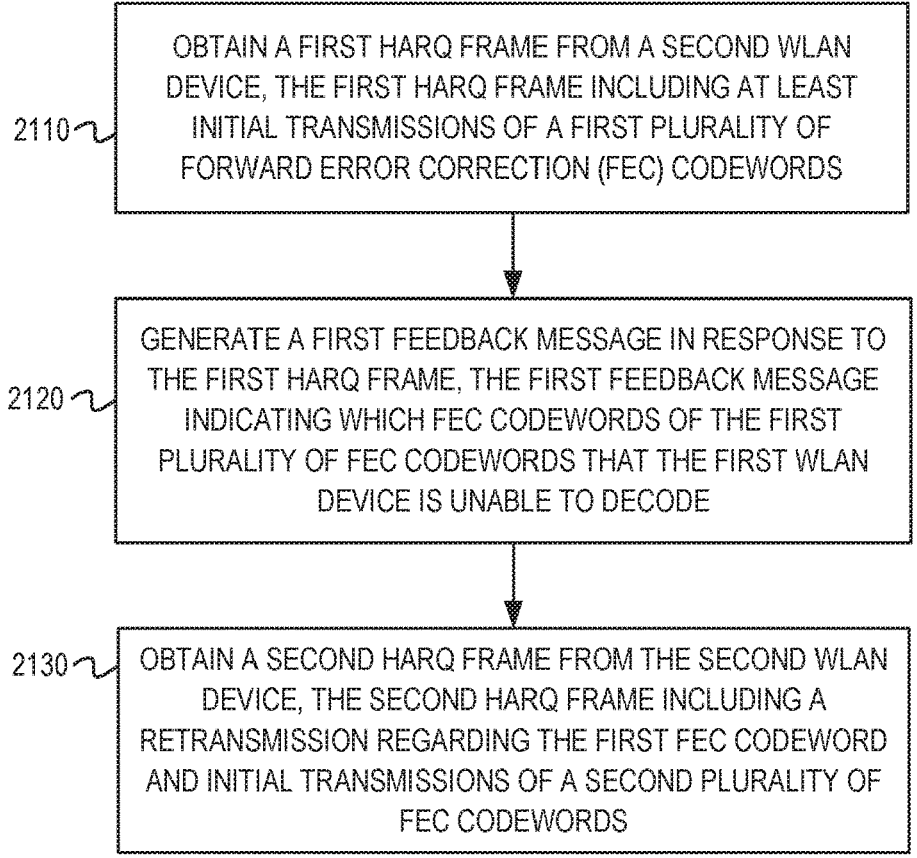
FIG. 21 depicts a flowchart with an example process for a WLAN device that communicates HARQ transmissions according to aspects of this disclosure.

FIG. 21 depicts a flowchart with an example process 2100 for a WLAN device that receives HARQ transmissions according to aspects of this disclosure. The example process 2100 may be performed by a first WLAN device (such as the second WLAN device 120 described herein) that participates in a retransmission protocol with another WLAN device that communicates HARQ transmissions. At block 2110, the first WLAN device may obtain a first HARQ frame from a second WLAN device. The first HARQ frame may include at least initial transmissions of a first plurality of forward error correction (FEC) codewords. At block 2120, the first WLAN device may generate a first feedback message in response to the first HARQ frame. The first feedback message may indicate which FEC codewords of the first plurality of FEC codewords that the first WLAN device is unable to decode. At block 2130, the first WLAN device may obtain a second HARQ frame from the second WLAN device. The second HARQ frame may include a retransmission regarding the first FEC codeword and initial transmissions of a second plurality of FEC codewords.

Figure 22:
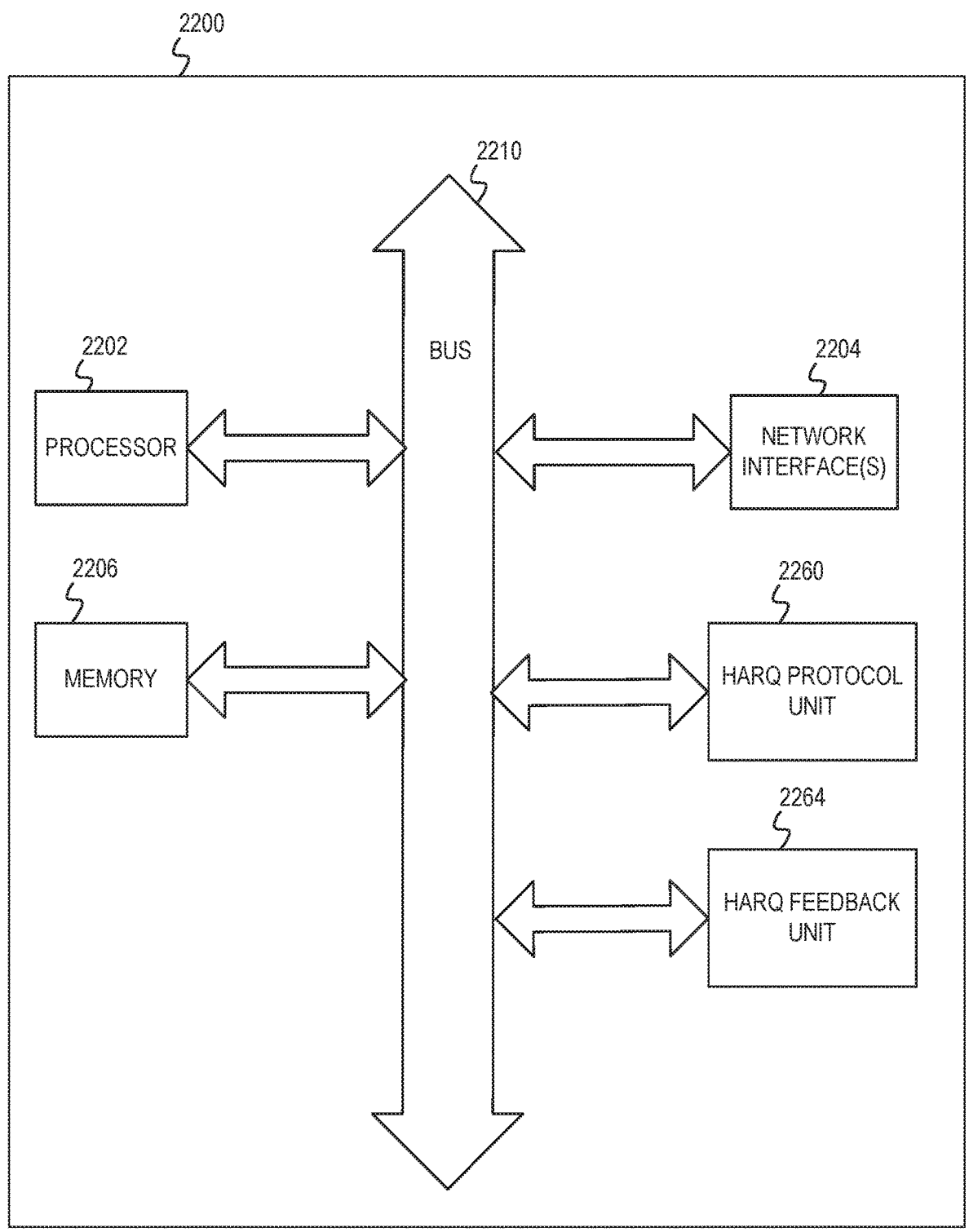
FIG. 22 shows a block diagram of an example electronic device for implementing aspects of this disclosure.

FIG. 22 shows a block diagram of an example electronic device for implementing aspects of this disclosure. In some implementations, the electronic device 2200 may be one of an access point (including any of the APs described herein), a range extender, or other electronic systems. The electronic device 2200 can include a processor 2202 (possibly including multiple processors, multiple cores, multiple nodes, or implementing multi-threading, etc.). The electronic device 2200 also can include a memory 2206. The memory 2206 may be system memory or any one or more of the possible realizations of computer-readable media described herein. The electronic device 2200 also can include a bus 2210 (such as PCI, ISA, PCI-Express, HyperTransport®, Infini-Band®, NuBus,® AHB, AXI, etc.), and a network interface 2204 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 2200 may support multiple network interfaces—each of which is configured to couple the electronic device 2200 to a different communication network.

The electronic device 2200 may include a HARQ protocol unit 2260 (which may implement a HARQ protocol as described herein) and a HARQ feedback unit 2264. In some implementations, the HARQ protocol unit 2260 and the HARQ feedback unit 2264 may be distributed within the processor 2202, the memory 2206, and the bus 2210. The HARQ protocol unit 2260 and the HARQ feedback unit 2264 can perform some or all the operations described herein. For example, the zz2260 may be similar to the HARQ protocol unit 112 or the HARQ protocol unit 122 as described in FIG. 2. The HARQ feedback unit 2264 may be similar to the HARQ feedback unit 124 described in FIG. 2.

The memory 2206 can include computer instructions executable by the processor 2202 to implement the functionality of the implementations described in FIGS. 1-21. Any of these functionalities may be partially (or entirely) implemented in hardware or on the processor 2202. For example, the functionality may be implemented with an application specific integrated circuit, in logic implemented in the processor 2202, in a co-processor on a peripheral device or card, etc. Further, realizations may include fewer or additional components not illustrated in FIG. 21 (such as video cards, audio cards, additional network interfaces, peripheral devices, etc.). The processor 2202, the memory 2206, and the network interface 2204 are coupled to the bus 2210. Although illustrated as being coupled to the bus 2210, the memory 2206 may be coupled to the processor 2202.

FIGS. 1-22 and the operations described herein are examples meant to aid in understanding example implementations and should not be used to limit the potential implementations or limit the scope of the claims. Some implementations may perform additional operations, fewer operations, operations in parallel or in a different order, and some operations differently.

While the aspects of the disclosure have been described in terms of various examples with their associated operations, a person skilled in the art would appreciate that a combination of operations from any number of different examples is also within the scope of the aspects of the disclosure. Some example variations and optional details are further described herein.

In some implementations, a WLAN device may determine a variety of codeword decoding status for different codewords of a HARQ transmission. Some possible codeword decoding statuses may include:

Decoding Success—decoder converged to a successful result

Decoding Failure—decoder unable to converge to a successful result, but the limit to the number of total CW transmissions not yet reached Decoding Incomplete—Decoding not attempted or finished due to processing limit Reached CW TX Limit—Reached the limit of the number CW transmissions without successful decoding A HARQ feedback message may include feedback for particular codewords based on the codeword decoding status. After each HARQ Transmission there may be some codewords whose decoding status is "Decoding Failure." The codewords having a status of "Decoding Failure" are those which the HARQ receiver has attempted to decode the codewords, the decoding was unsuccessful, and the codeword (re)transmission limit has not yet been met. In some implementations, the HARQ receiver may request retransmission of only those codewords having "Decoding Failure" status. In some implementations, other codewords (having a codeword decoding status other than "Decoding Failure") may not require retransmission in the next HARQ transmission. For example, the other code words may have been successfully decoded ("Decoding Success" status), a decoding attempt has not yet completed ("Decoding Incomplete" status), or the codeword has been retransmitted the maximum number of permissible times ("Reached CW TX Limit" status).

In some implementations, the sliding codeword feedback may be used for a standardized HARQ (re)transmission process. For example, the format of the H-FB may be the same for each H-FB. The first H-FB message may deal with the first set of codewords while the tenth H-FB message will deal with much later set of codewords. The use of sliding codeword feedback in the H-FB messages may reduce the amount of feedback needed in each H-FB message. For example, the sliding codeword feedback may include a subfield indicating the starting codeword number, a subfield indicating the length of the codeword bit map, a subfield of the codeword bit map, or any combination thereof. The sliding codeword feedback may include a value giving the codeword index indicating which codewords no longer need to be kept in memory by the HARQ transmitter. The memory at the transmitter for any codeword with an index less than or equal to this codeword index can be freed-up by the transmitter.

In addition to the examples described herein, a HARQ feedback message may include additional information for the HARQ process. For example, the additional information can be used to indicate to the HARQ transmitter what changes to the transmission would be useful to better fit the current channel conditions. This may be useful since the HARQ receiver is able to make measurements on signals that carry the HARQ transmissions. Additional HARQ feedback content may include an indication to modify the modulation used in the next HARQ transmission. For example, the indication may indicate a specific modulation order or may indicate a change (up or down) from the current modulation order. In another example, the HARQ feedback may include additional information regarding which set of code bits to send in the retransmission of the codewords. By indicating the set of code bits to retransmit, the HARQ receiver may change the effective code rate by requesting either a few code bits or many code bits from the original codeword. For example, the HARQ receiver may request just punctured bits or may request additional code bits for a more robust retransmission. When the channel quality is poor, the HARQ receiver may request (or recommend) the sending of additional code bits in the next HARQ retransmission. In yet another example, a HARQ feedback message may indicate the amount of time required by the HARQ receiver to complete decoding of all the codewords it has received up until that time.

This disclosure includes several examples of HARQ transmissions. In some implementations a HARQ PPDU may contain an initial HARQ transmission (In-TX) of some codewords and a HARQ retransmission (Re-TX) of other codewords. The number of bits in the In-TX can be set by the HARQ transmitter. For example, the HARQ transmitter may include all the bits in the codeword, or it may only contain a subset of bits, such as 80% or 90% of the codeword bits. Some of the bits in the codeword may be "punctured" meaning they are not transmitted. The preamble of the HARQ PPDU may include a subfield of the signal field that indicates the number of bits for the codewords in the In-TX portion of the HARQ PPDU. Similarly, the number of bits for the codewords in the Re-TX may have all or a subset of the bits from the codeword. For example, if 20% of the codeword bits were punctured in the In-TX then those punctured code bits (the 20%) can be sent in the Re-TX of a later HARQ transmission. The preamble of the HARQ PPDU sent by the HARQ transmitter can include a subfield of the signal field that indicates the number of bits for the codewords in the Re-TX portion of the HARQ PPDU.

In some implementations, the last HARQ transmission may be handled differently from other HARQ transmissions in a HARQ exchange. For example, the last HARQ transmission may contain only retransmissions of codewords. It may be possible to send some In-TX codewords if the MCS is such that the HARQ transmitter has high confidence that the new In-TX codewords will be decoded correctly. However, typically the last HARQ transmission may only include Re-TX codewords. Since codeword retransmissions can carry a small subset of the code bits in the codeword, the number Re-TX codewords received in a given amount of time at the HARQ receiver can be higher than when receiving In-TX codewords. To avoid transmitting too many Re-TX codewords in a given time period, the HARQ transmitter can send the Re-TX codewords in the last HARQ transmission with more code bits per Re-TX codeword. Additionally, or alternatively, the last HARQ transmission may be sent at a lower modulation order. By including more code bits per Re-TX codeword in the last HARQ transmission or using a lower modulation order (or both), the transmission time for the last HARQ transmission may be lengthened. This may allow the HARQ receiver to complete codeword decoding in time to send a Block ACK at a specified time after the end of the last HARQ transmission.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures, and indicate relative positions corresponding to the orientation of the Figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for use in a first wireless local area network (WLAN) device that supports a hybrid automatic repeat request (HARQ) protocol, comprising:
   at least one processor; and
   at least one memory communicatively coupled with the at least one processor and storing processor-readable code that, when executed by the at least one processor, causes the apparatus to:
   generate a first HARQ frame for transmission to a second WLAN device, the first HARQ frame including at least initial transmissions of a first plurality of codewords;
   obtain a first feedback message from the second WLAN device, the first feedback message indicating which failed codewords of the first plurality of codewords that a physical layer (PHY) of the second WLAN device has attempted to decode and is unable to decode; and
   generate a second HARQ frame for transmission to the second WLAN device, the second HARQ frame including at least a retransmission regarding at least the failed codewords and initial transmissions of a second plurality of codewords.

2. The apparatus of claim 1, wherein the first feedback message includes a bitmap to indicate a decoding failure of the failed codewords of the first HARQ frame, and wherein the bitmap includes ordered bits that correspond to an ordered set of groups of codewords of the first plurality of codewords.

3. The apparatus of claim 2, wherein the first feedback message includes a field indicating a starting codeword associated with a first bit of the ordered bits.

4. The apparatus of claim 2, wherein the first feedback message includes a field indicating a length of the bitmap.

5. The apparatus of claim 2, further comprising:
a wireless communication device comprising the at least one processor and the at least one memory;
at least one transceiver coupled to the wireless communication device;
at least one antenna coupled to the at least one transceiver to wirelessly transmit signals output from the at least one transceiver and to wirelessly receive signals for input into the at least one transceiver; and
a housing that encompasses the wireless communication device, the at least one transceiver and at least a portion of the at least one antenna.

6. The apparatus of claim 1, wherein the first feedback message includes an indication a highest codeword index which the second WLAN device has successfully decoded, and wherein the processor-readable code, when executed by the at least one processor, further causes the apparatus to:
remove codewords having a codeword index lower than the highest codeword index from a HARQ transmitter memory of the first WLAN device.

7. The apparatus of claim 1, wherein the first feedback message does not include feedback for pending codewords from the first plurality of codewords that the second WLAN device is still processing or pending decoding.

8. The apparatus of claim 1, wherein the first feedback message includes an indication of an amount of pending codewords that the second WLAN device is still processing or decoding from the first plurality of codewords or an amount of time pending for the second WLAN device to complete decoding of the amount of pending codewords from the first plurality of codewords.

9. The apparatus of claim 1, wherein the processor-readable code, when executed by the at least one processor, further causes the apparatus to:
determine a receiver processing capability of the second WLAN device; and
determine a quantity of the second plurality of codewords to include in the second HARQ frame based, at least in part, on the receiver processing capability.

10. The apparatus of claim 9, wherein the receiver processing capability is based on at least one member of a group consisting of:
an amount of memory available at the second WLAN device for processing HARQ transmissions;
a time delay for the second WLAN device to process the HARQ transmissions;
an amount of time for PHY processing of the failed codewords using the second HARQ frame to determine corrected codewords;
a media access control (MAC) layer processing time of the HARQ transmissions; and
the MAC layer processing time to prepare an acknowledgement to an aggregated MAC protocol data unit (A-MPDU) associated with the HARQ transmissions.

11. The apparatus of claim 1, wherein the processor-readable code, when executed by the at least one processor, further causes the apparatus to:
include signaling in a preamble of the second HARQ frame, the signaling indicative of a length of either one of the retransmissions or the initial transmissions.

12. The apparatus of claim 1, wherein the processor-readable code, when executed by the at least one processor, further causes the apparatus to:
determine to generate a subsequent HARQ frame for transmission to the second WLAN device, wherein the subsequent HARQ frame is a last HARQ frame of a HARQ transmission; and
generate the last HARQ frame using a different format for the last HARQ frame based, at least in part, on a receiver processing capability for processing the last HARQ frame,
wherein the different format includes a change to at least member of a group consisting of bit rate, coding rate, quantity of repeated code bits, and puncturing rate, and
wherein the change is based on at least to provide additional time or greater reliability for the second WLAN device to process the last HARQ frame before a time for the second WLAN device to send a feedback message regarding the last HARQ frame.

13. The apparatus of claim 1, wherein the processor-readable code, when executed by the at least one processor, further causes the apparatus to:
obtain a second feedback message from the second WLAN device, wherein the second feedback message indicates that the second WLAN device has reached a maximum number of decoding failures for the failed codewords; and
refrain from including a further retransmission of the failed codewords in a subsequent HARQ frame.

14. The apparatus of claim 1, wherein the first feedback message includes an indicator to change a HARQ configuration parameter based, at least in part, on the first HARQ frame, wherein the indicator is based, at least in part, on channel conditions of a wireless channel between the first WLAN device and the second WLAN device, and wherein the HARQ configuration parameter includes a modulation order, bit rate, coding rate, quantity of repeated code bits, or puncturing rate.

15. The apparatus of claim 1, wherein the first feedback message includes a recommended code bit rate to include in the retransmission regarding the failed codewords, the recommended code bit rate based on puncturing rate or quantity of retransmitted code bits.

16. An apparatus for use in a first wireless local area network (WLAN) device that supports a hybrid automatic repeat request (HARQ) protocol, comprising:
at least one processor; and
at least one memory communicatively coupled with the at least one processor and storing processor-readable code that, when executed by the at least one processor, causes the apparatus to:
obtain a first HARQ frame from a second WLAN device, the first HARQ frame including at least initial transmissions of a first plurality of codewords;
generate a first feedback message for transmission to the second WLAN device in response to the first HARQ frame, the first feedback message indicating one or more failed codewords of the first plurality of codewords that a physical layer (PHY) the first WLAN device is unable to decode; and
obtain a second HARQ frame from the second WLAN device, the second HARQ frame including a retransmission regarding at least the one or more failed codewords and initial transmissions of a second plurality of codewords.

17. The apparatus of claim 16, wherein the first feedback message includes a bitmap to indicate a decoding failure of the one or more failed codewords of the first HARQ frame, and the bitmap includes ordered bits that correspond to an ordered set of groups of codewords of the first plurality of codewords.

18. The apparatus of claim 17, wherein the processor-readable code, when executed by the at least one processor, further causes the apparatus to:

include, in the first feedback message, a field indicating a starting codeword associated with a first bit of the ordered bits and a length of the bitmap.

19. The apparatus of claim 18, wherein the length of the bitmap is determined based on at least a quantity of codewords in the first HARQ frame.

20. The apparatus of claim 16, wherein the first feedback message includes an indication of an amount of pending codewords that the second WLAN device is still processing or decoding from the first plurality of codewords or an amount of time pending for the first WLAN device to complete decoding of the amount of pending codewords from the first plurality of codewords.

21. The apparatus of claim 16, wherein the first feedback message includes an indication a highest codeword index which the first WLAN device has successfully decoded, the indication provided to the second WLAN device so that the second WLAN device can remove old codewords from a HARQ transmitter memory of the second WLAN device.

22. The apparatus of claim 16, wherein the processor-readable code, when executed by the at least one processor, further causes the apparatus to:
generate a second feedback message for transmission to the second WLAN device, wherein the second feedback message indicates that the first WLAN device has reached a maximum number of decoding failures for the one or more failed codewords.

23. The apparatus of claim 16, further comprising:
a wireless communication device comprising the at least one processor and the at least one memory;
at least one transceiver coupled to the wireless communication device;
at least one antenna coupled to the at least one transceiver to wirelessly transmit signals output from the at least one transceiver and to wirelessly receive signals for input into the at least one transceiver; and
a housing that encompasses the wireless communication device, the at least one transceiver and at least a portion of the at least one antenna.

24. A method for wireless communication by a wireless communication device of a first wireless local area network (WLAN) device that supports a hybrid automatic repeat request (HARQ) protocol, comprising:
generating a first HARQ frame for transmission to a second WLAN device, the first HARQ frame including at least initial transmissions of a first plurality of codewords;
receiving a first feedback message from the second WLAN device, the first feedback message indicating which failed codewords of the first plurality of codewords that a physical layer (PHY) of the second WLAN device has attempted to decode and is unable to decode; and
generating a second HARQ frame for transmission to the second WLAN device, the second HARQ frame including at least a retransmission regarding at least the failed codewords and initial transmissions of a second plurality of codewords.

25. The method of claim 24, wherein the first feedback message includes a bitmap to indicate a decoding failure of the failed codewords of the first HARQ frame, and wherein the bitmap includes ordered bits that correspond to an ordered set of groups of codewords of the first plurality of codewords.

26. The method of claim 24, wherein the first feedback message includes an indication a highest codeword index which the second WLAN device has successfully decoded, the method further comprising:
removing codewords having a codeword index lower than the highest codeword index from a HARQ transmitter memory of the first WLAN device.

27. The method of claim 24, wherein the first feedback message includes an indication of an amount of pending codewords that the second WLAN device is still processing or decoding from the first plurality of codewords or an amount of time pending for the second WLAN device to complete decoding of the amount of pending codewords from the first plurality of codewords, and wherein the first feedback message does not include feedback for codewords from the first plurality of codewords that the second WLAN device is still processing or pending decoding.

28. A method for wireless communication by a wireless communication device of a first wireless local area network (WLAN) device that supports a hybrid automatic repeat request (HARQ) protocol, comprising:
obtaining a first HARQ frame from a second WLAN device, the first HARQ frame including at least initial transmissions of a first plurality of codewords;
generating a first feedback message for transmission to the second WLAN device in response to the first HARQ frame, the first feedback message indicating one or more failed codewords of the first plurality of codewords that a physical layer (PHY) of the first WLAN device is unable to decode; and
obtaining a second HARQ frame from the second WLAN device, the second HARQ frame including a retransmission regarding at least the one or more failed codewords and initial transmissions of a second plurality of codewords.

29. The method of claim 28, wherein the first feedback message includes a bitmap to indicate a decoding failure of the one or more failed codewords of the first HARQ frame, and wherein the bitmap includes ordered bits that correspond to an ordered set of groups of codewords of the first plurality of codewords.

30. The method of claim 29, further comprising:
including, in the first feedback message, a field indicating a starting codeword associated with a first bit of the ordered bits and a length of the bitmap.

* * * * *